United States Patent
Okita et al.

(10) Patent No.: US 6,620,262 B1
(45) Date of Patent: Sep. 16, 2003

(54) METHOD OF MANUFACTURING INNER AND OUTER RACES OF DEEP GROOVE BALL BEARING IN CONTINUOUS ANNEALING FURNACE

(75) Inventors: Shigeru Okita, Yokohama (JP); Akihiro Kiuchi, Naka-gun (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/380,227

(22) PCT Filed: Dec. 26, 1997

(86) PCT No.: PCT/JP98/05965

§ 371 (c)(1),
(2), (4) Date: Aug. 25, 1999

(87) PCT Pub. No.: WO99/34023

PCT Pub. Date: Jul. 8, 1999

(30) Foreign Application Priority Data

Dec. 26, 1997 (JP) .............................................. 9/366705
May 8, 1998 (JP) ........................................... 10/125942

(51) Int. Cl.⁷ .............................. C23C 8/22; C21D 6/00
(52) U.S. Cl. ..................................... 148/226; 148/659
(58) Field of Search ................................ 266/252, 257; 148/659, 226

(56) References Cited

U.S. PATENT DOCUMENTS

| 4,359,351 A | * 11/1982 | Levis ........................ 148/16.7 |
| 4,622,006 A | * 11/1986 | Hohne ......................... 432/11 |
| 5,705,124 A | * 1/1998 | Ochi et al. ................... 420/105 |
| 5,868,871 A | * 2/1999 | Yokose et al. ............... 148/211 |

FOREIGN PATENT DOCUMENTS

| JP | 55-49125 | 12/1980 |
| JP | 56-158812 A | * 12/1981 | ............ C21D/1/00 |
| JP | 63-72821 | 4/1988 |
| JP | 2-125810 | 5/1990 |
| JP | 5-5171 | 1/1993 |
| JP | 7-11380 | 1/1995 |
| JP | 7-37645 | 2/1995 |
| JP | 8-303470 | 11/1996 |

OTHER PUBLICATIONS

Okaya Machines Inc. and Yusin Instruments Inc.; "USC–type carbon sensor control system," *Casting, Forging & Heat Treatment*; 379:77–79; Aug. 1978.

Kobayashi, Kunio, "Control of Atmosphere in Flames Heat Treatment Furnace by Furnace Atmospheric Sensor"; *Oriental Engineering Inc., Section of Designing*; pp. 109–114; Metal, Special Edition; Apr. 1979.

* cited by examiner

*Primary Examiner*—Roy King
*Assistant Examiner*—Harry D. Wilkins, III
(74) *Attorney, Agent, or Firm*—Christensen O'Connor Johnson Kindness PLLC

(57) ABSTRACT

The continuous annealing furnace has two or more treatment chambers sequentially connected with each other and respectively filled with a gas atmosphere differing in carburizing property, which includes a carburizing chamber wherein roller members to be treated are carburized at 750° C. to 820° C., a slow cooling chamber wherein the roller members are cooled at said temperature or less of the carburizing chamber, an intermediate chamber including atmosphere gas blocking doors that can open/close an exit of the carburizing chamber and an entrance of the slow cooling chamber independently, and transferring means, and each chambers is filled to satisfy a relationship of $K_1 - K_2 \geq 2$ where $K_1$ represents a partial pressure ratio between CO and $CO_2$ in an atmosphere within the carburizing chamber and $K_2$ represents a partial pressure ratio between CO and $CO_2$ in an atmosphere within the slow cooling chamber.

6 Claims, 11 Drawing Sheets

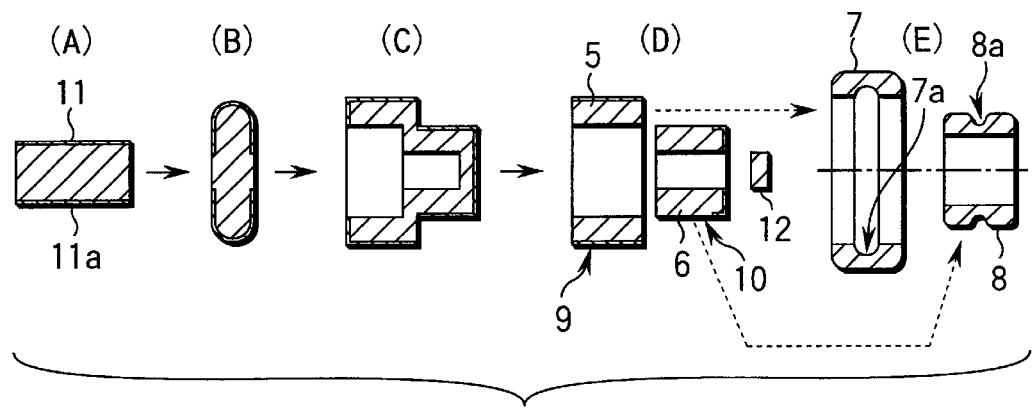
FIG. 4
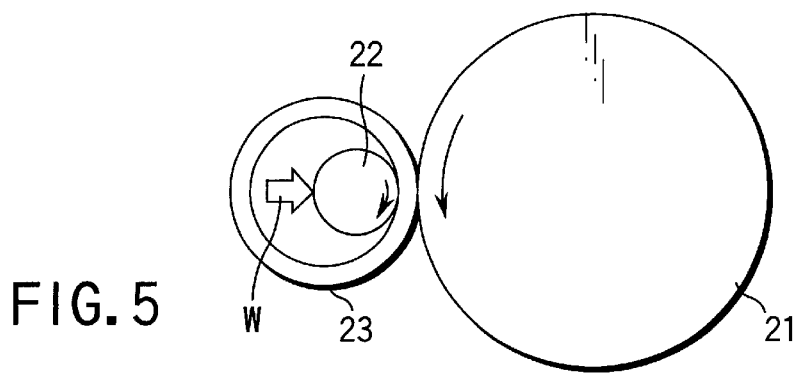
FIG. 5
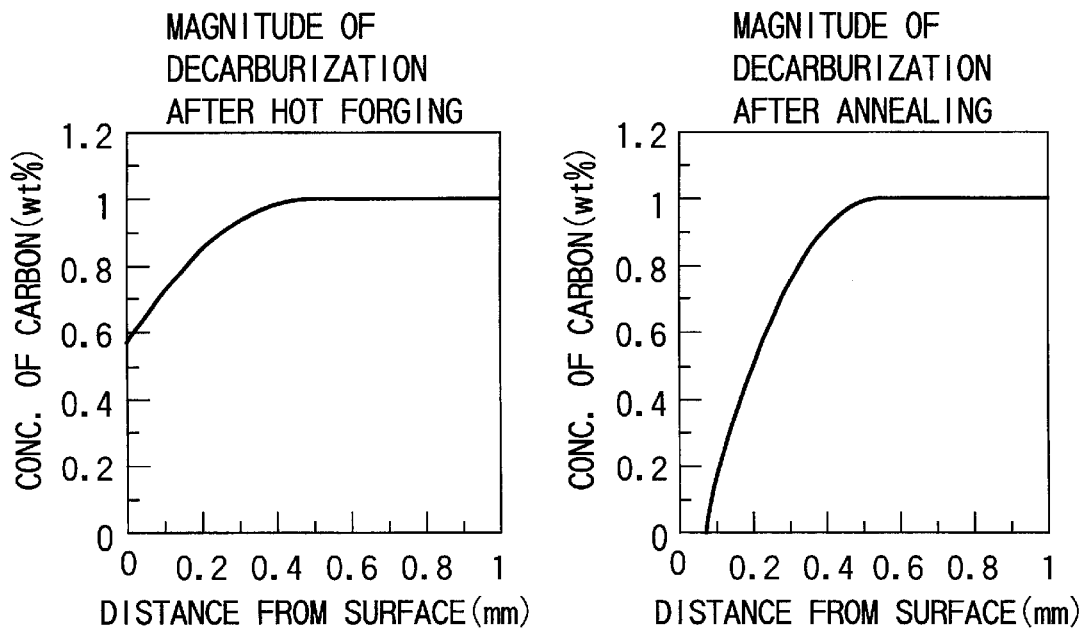
FIG. 6
FIG. 7

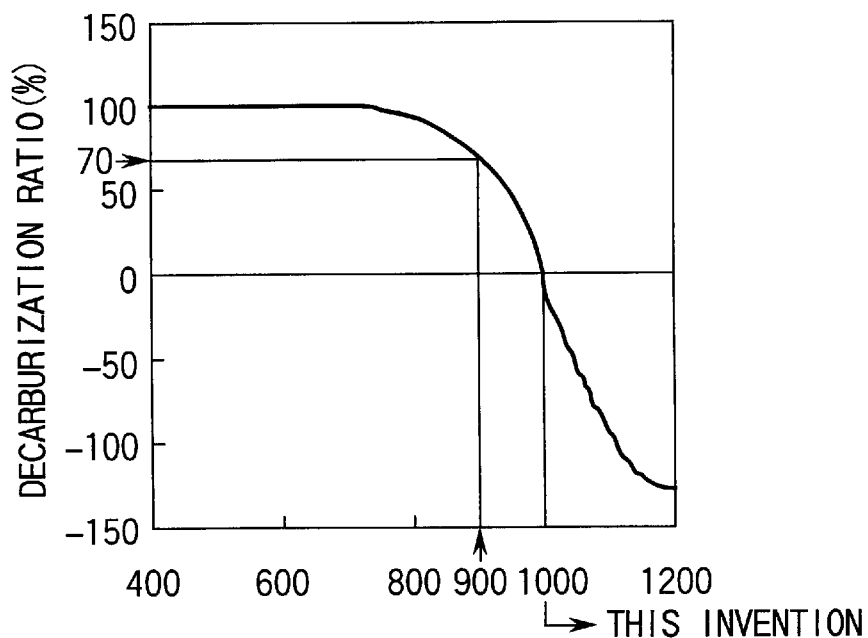
FIG. 13  VALUE OF OXYGEN SENSOR(mmV)
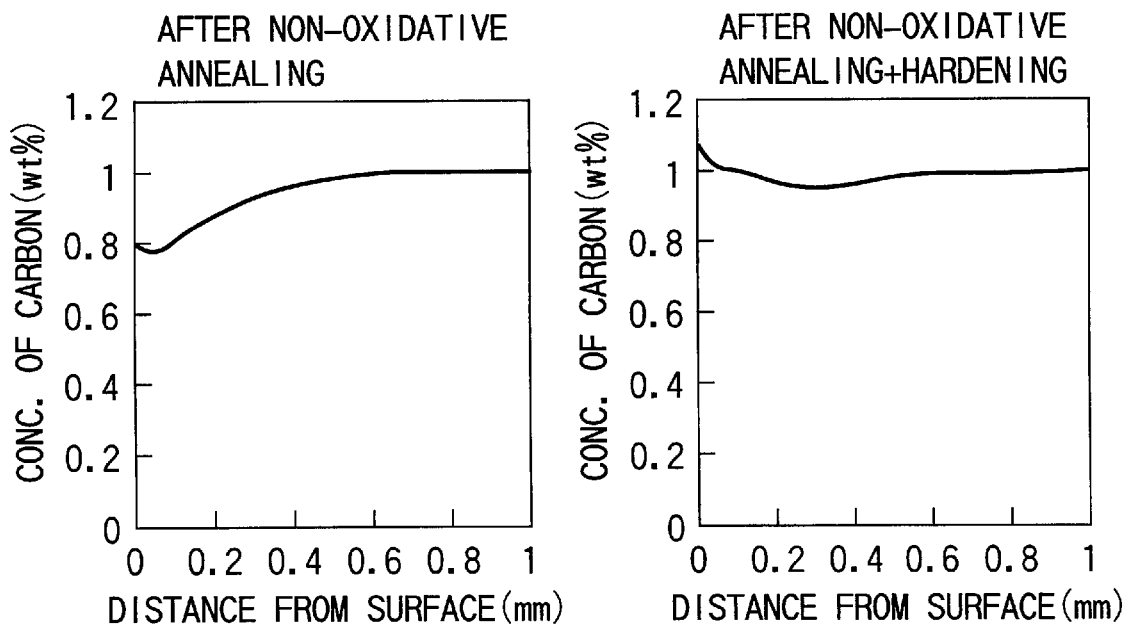
FIG. 14
FIG. 15

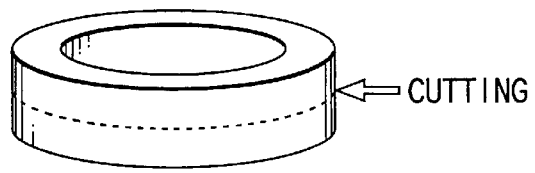
FIG. 30A
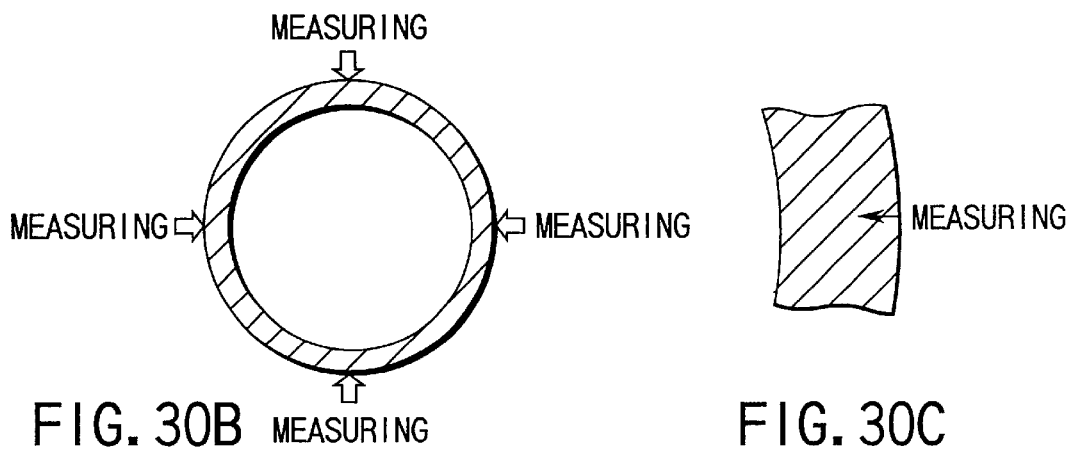
FIG. 30B
FIG. 30C
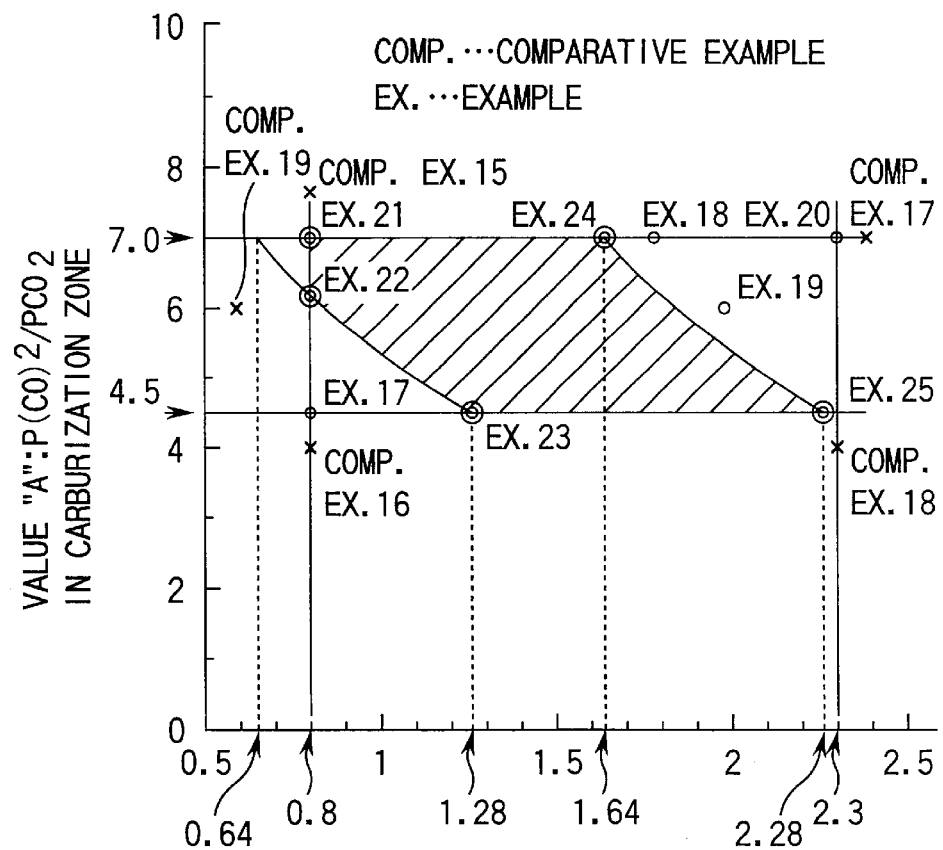
FIG. 31

METHOD OF MANUFACTURING INNER AND OUTER RACES OF DEEP GROOVE BALL BEARING IN CONTINUOUS ANNEALING FURNACE

This is a national phase application based on International Application PCT/JP98/05965 filed Dec. 25, 1998. International Application PCT/JP98/05965 was not published under PCT Article 21(2) in the English Language.

TECHNICAL FIELD

This invention relates to a continuous annealing furnace, to a roller bearing, to an annealing method and to a method for manufacturing an inner ring and an outer ring for a deep groove ball bearing. In particular, this invention relates to a technique which is useful for the manufacturing machine parts mainly concerning a roller bearing to be employed in various portions of a two-wheeler, a motor car, an agricultural machinery, a construction machine, etc.

BACKGROUND ART (1) FIG. 1 illustrates a method of manufacturing an inner ring and an outer ring for a deep groove ball bearing which involves a turning work after a heat treatment, and which is generally employed in view of saving the manufacturing cost.

As for the raw round bar, a steel round bar which has been rolled is generally employed as it is (S1). Then, a hot forging is performed generally using a multi-stage former thereby to produce a rough ring to be subsequently finished into an inner ring or an outer ring (S2). After this hot forging, by means of softening, the hardness of the rough ring is lowered or the microstructure of the rough ring is improved for the convenience of the following steps (S3). Then, a cold rolling work (hereinafter, referred to as CRF working) is performed (S4). By the way, this CRF working is performed, as schematically shown in FIG. 5, for thinning the cross-section of the rough ring 23 and at the same time, for enlarging the diameter of the rough ring 23 by rolling the rough ring 23 interposed between a molding roll 21 and a mandrel 22 under a load of "W" on the rough ring 23.

FIG. 3 illustrates a forging process wherein the aforementioned CRF working is not employed. Namely, in order to fabricate forged rings 1 and 2, a ring 3 and a fraction 4 are discarded as a scrap. On the other hand, when the CRF working is employed, small forged rings 5 and 6 are produced as shown in FIG. 4(D) in a hot forging step, and then, these forged rings 5 and 6 are diametrally enlarged to form CRF rings 7 and 8 as shown in FIG. 4(E). Therefore, the ring 3 shown in FIG. 3(D) is no more required to be produced, and the fraction 4 shown in FIG. 3(D) can be also made smaller as represented by a fraction 12 as shown in FIG. 4(D). Furthermore, a groove 7a or 8a may be formed on the raceway surface of the CRF ring 7 or 8, respectively, at the occasion of obtaining a diametrally enlarged CRF ring 7 or 8, thereby minimizing as much as possible the magnitude of turning, thus resulting in an excellent saving of material.

Next, a sizing of the ring is performed (S5) as shown in FIG. 1. Subsequently, the entire surface of the CRF ring is subjected to a turning work (S6) thereby to remove an oxide layer or a decarbonized layer that has been formed during the forging or annealing, or thereby to form the CRF ring into a deep groove ball bearing after a heat treatment or grinding. Depending on certain circumstances, a flash that may happen to be formed during the hot forging may be removed by means of grinding before the aforementioned turning work. Then, the ring is subjected to a quenching and an annealing thereby to obtain a suitable hardness of the ring required for the bearing (S7). Next, the raceway surface and the fitting surface of the ring is subjected to a grinding work thereby to manufacture an inner ring and an outer ring (S8).

Japanese Patent Publication H6-83872 discloses a method wherein a rough ring is subjected to a turning work thereby making the ring fixed in configuration and in weight prior to the CRF working, and then, the resultant ring is subjected to a high precision CRF working in which the ring is completely finished to form a raceway surface groove as well as a sealing groove which are desired as a deep groove ball bearing, thereby making it possible to omit the subsequent turning work, and to save the manufacturing cost.

By the way, this CRF working is a process, as mentioned above, for enlarging the diameter of the rough ring (such as a forging ring or a turning ring) thereby to make the rough ring into a CRF ring. Therefore, although it is possible to adjust the thickness and the magnitude of enlarging the diameter of the ring, it is impossible to control the dimension in the lateral direction of the ring, thus allowing a flash to be generated in the lateral direction of the ring.

In the case of the method disclosed in Japanese Patent Publication H6-83872 where a high precision CRF working is performed, a flash extending in the lateral direction is caused to be generated, or fine cracks due to the cold working are also caused to be generated at the edge portion of a sealing groove forming a complicated configuration or of a race groove. Therefore, not only a full-face turning work for adjusting the dimension or for making the volume constant is required to be performed prior to the CRF working, but also a finishing turning work for removing the fine cracks is required to be performed after the CRF working. Further, when a complicated configuration is to be obtained through a high-precision CRF working, the working time would be prolonged and the cost for the CRF working would be increased.

On the other hand, in the method where a turning work is not performed prior to the CRF working as shown in FIG. 1, a groove (the groove 7a or 8a in FIG. 4) is usually formed on the raceway surface at the occasion of enlarging the diameter of the ring by making use of the CRF working so as to minimize as much as possible the magnitude of turning. However, the magnitude of turning is excessively minimized, the decarbonized layer that has been formed during the hot forging or softening may be left remained after the turning work, thus raising a problem in terms of the function of the bearing. As a result, a full-face turning work is also required to be performed on the ring after the CRF working, thus leaving a room for further improvement regarding the reduction of manufacturing cost through a simplification of manufacturing steps.

Since the bearing is subject to a repeated load at a small contacting surface thereof, i.e. between the raceway surface thereof and a rolling element, the bearing is generally formed of a hard steel which is capable of withstanding this repeated load (stress) and has a uniform structure and an excellent abrasion resistance. Therefore, a high carbon chromium bearing steel (SUJ2) which is defined in the JISG 4805 is typically employed for the bearing. This bearing steel is featured in that, in view of ensuring a high hardness, the content of carbon in this raw material is as high as about 1%.

Therefore, when this bearing steel is heated at a high temperature in the air atmosphere in the manufacturing steps thereof, the surface of the bearing steel is decarbonized, thus failing to obtain a predetermined hardness if this heat-treated bearing steel is to be employed as it is. This means that if a decarbonized layer is left remained on the rolling contact surface of the bearing after the manufacture thereof, the capabilities of the bearing such as the life and abrasion resistance thereof may be deteriorated.

In the ordinary manufacturing method of the bearing ring, a method wherein a steel bar obtained from rolling is directly formed into a rectangular ring by means of a hot forging, and then, the resultant ring is subjected to a finishing work by means of turning work, or a method wherein a tubular material is subjected to a finishing work by means of turning work has been employed. There are also known various working methods for forming a ring. In any of these working methods however, a spheroidizing annealing is performed prior to the turning work in order to facilitate the workability of raw material.

The decarburization of the bearing steel is caused to occur at first in the processing of raw material among the steps of manufacturing the bearing ring. Namely, a raw material for the bearing is formed into a billet by making use of a blooming mill and then, worked into a bar, a tube or a wire by means of a hot rolling, thus preparing a raw material for the manufacture of a bearing. Since the billet in the blooming mill, or the bar or tube in the hot rolling is subjected to a heating at a temperature of as high as over 1,150° C. or around 1,200° C. in air atmosphere, a decarbonized layer of as thick as several micrometers to several hundreds micrometers may be formed on the surface of the bar, tube, etc., i.e. the generation of decarburization has been an unavoidable problem. Moreover, when a ring is to be formed using such a raw material by means of hot forging, the ring is again exposed to a high temperature (about 1,150° C.) in air atmosphere, the decarbonized layer or the resultant ring becomes deeper as it is combined with the decarbonized layer formed initially in the stage of raw material. Additionally, the concentration of carbon in the surface layer of the ring is also caused to decrease further.

This decarburization may be recognized also in the spheroidizing annealing that will be performed prior to the turning work or the finishing work of grinding. The spheroidizing annealing of bearing steel has been conventionally performed prior to the turning work in order to facilitate the workability of raw material. For example, a typical method of the spheroidizing annealing is set forth in the publication: "Heat-treatment", Vol. 18, No. 1 pp. 22. Namely, the ordinary method thereof comprises the steps of heating a bearing steel up to a point (780 to 810° C.) immediately over the Al transformation temperature thereof, and annealing the bearing steel at a temperature (730 to 750° C.) in the vicinity of the Al transformation temperature thereof. Although the temperature employed in this heat treatment is lower than the temperatures to be employed in the hot forging or the carburizing treatment, since the bearing steel is exposed to a heating for a period of as long as more than 12 hours, the carbonization thereof would be further promoted if the treatment atmosphere employed is formed of an oxidizing atmosphere such as air atmosphere.

With a view to solve this problem, a method of removing the decarburization by means of a turning or grinding work has been applied to an ordinary raw material. Further, for the purpose of completely removing a decarbonized layer or obtaining a precise configuration of raceway surface after a spheroidization annealing, a turning or grinding work has been applied also to the ring that has been finish-worked or turn-worked thereby to remove the decarbonized layer formed thereon. However, these methods invite a big increase in manufacturing cost due to an increase in manufacturing step and to a lowering of yield.

In recent years, in view of improving the productivity and saving the manufacturing cost, the magnitude of cutting in the finishing turning or grinding step is desired. Further, since it has become possible to precisely form the ring by means of cold rolling to be performed after annealing, the turning or grinding work itself can be sometimes dispensed with. Accordingly, in order to reduce the turning or grinding step (a reduction of manufacturing steps), it is now desired that any decarbonized layer is no more left after the spheroidization annealing step.

Therefore, in view of minimizing the decarbonized layer, a method of applying a carburizing treatment to a raw material after rolling (such as bar, tube or wire) thereby to minimize the decarbonized layer has been variously proposed and actually practiced. For example, in the case of a coil element for wire rod, an atmospheric annealing is employed at the occasion of the spheroidization annealing step. However, in the case of the wire rod, once a carburization has been generated by means of the atmospheric annealing, the surface layer is hardened so that a working flaw may be generated at the occasion of drawing.

Therefore, although the depth of decarburization is required to be precisely controlled, it has been difficult according to the prior method to control the depth of decarburization. The spheroidizing annealing generally comprises the steps of heating a work piece up to a point (about 800° C.) immediately over the Al transformation temperature thereof, and gradually cooling the work piece down to a temperature lower than the Al transformation temperature (about 700° C.). Therefore, if a carburizing gas atmosphere is employed at a relatively low temperature, a sooting is caused to generate (the precipitation of soot). If the soot is adhered onto the work piece, an additional step for removing the soot is required to be included in the subsequent steps, and therefore, the cost for maintenance of the furnace is additionally required.

As a method of minimizing the decarburization in the spheroidizing annealing step in the case of a bearing steel of high carbon, a method of recarburizing the decarbonized layer that has been generated in the rolling step in the manufacture of a raw material has been conventionally proposed (for example, Japanese Patent Unexamined Publication H7-37645; Japanese Patent Publication H7-30438; Japanese Patent Unexamined Publication H2-54717; and Japanese Patent Unexamined Publication H5-148611). According to Japanese Patent Unexamined Publication H5-148611 and Japanese Patent Publication H7-30438, for the purpose of preventing and minimizing the decarburization, the recarburization of the decarbonized layer is performed in a carburizing atmosphere. Further, according to the methods disclosed in these publications, for the purpose of performing the spheroidizing annealing, a work piece is once heated up to the Al transformation temperature or more, but the control of carburization is performed mainly at a lower temperature zone with a view that the carburization (recarburization) of the work piece can be preferably performed at the temperature zone which is not more than the Al transformation temperature (for example, 710° C. or less).

However, even in this recarburization method which is to be performed at a low temperature which is not more than around the Al transformation temperature, the gas atmosphere to be employed in the recarburization is required to be formed of a carburizing gas, and at the same time, the work piece is required to be gradually cooled while controlling the carburizing gas. In the case of this method also, since a carburizing gas atmosphere is employed at a relatively low temperature as in the case of the atmospheric annealing of a wire rod, soot may be caused to precipitate thus generating a sooting, and therefore, it requires a precise control of the carburization.

Further, in the case of the method shown in Japanese Patent Unexamined Publication H5-148611, even though the carburization (recarburization) of the work piece is performed also at a temperature which is not more than the Al temperature, a work piece is rendered to pass through a carburizing gas atmosphere even in a homogenous heating zone (carburizing zone) of not less than the Al temperature. Accordingly, even if the control of atmosphere (carburizing gas atmosphere) is performed at a temperature of not more than the Al temperature, the level (high or low) of setting the atmosphere in the homogenous heating zone gives a big influence to the concentration of carbon in the surface layer of the work piece after the annealing, thus leaving a room for improvement with regard to the control of atmosphere in the homogenous heating zone as well as at the temperature of not more than the Al temperature.

According to Japanese Patent Unexamined Publication H7-37645, after a carburization is performed, the resultant work is required to be re-heated in a direct type annealing furnace filled with an oxidizing atmosphere so as to remove the carburization layer, thereby adjusting the concentration of carbon in the surface layer, thus resulting in an increase in manufacturing cost. Further, according to Japanese Patent Unexamined Publication H2-54717, a continuous process is set forth. However, this continuous process is simply formed of a combination of a carburization treatment and a spheroidizing annealing treatment, thus simply prolonging the treatment time more than required.

Since the recarburization treatment of a raw material is performed by taking the processing of the raw material in the subsequent steps into consideration, the decarburization can be minimized. However, this recarburization treatment should be performed so as not to render the surface or the work piece to become excessively carbonized thereby to give a bad influence to the subsequent steps. Accordingly, some of the prior methods require a separate step of decarburization treatment after the recarbonization treatment, thus making the method more complicated, while other methods require a carbonization treatment prior to the annealing treatment, thus prolonging the entire processing time.

In order to perform a full recarbonization treatment in a spheroidizing annealing step at a low cost, the control of carbonization atmosphere at low temperatures or a follow-up control of carbonization atmosphere in relative to changes in temperature at low temperatures is required. Additionally, it is also required that a treatment method or a treatment furnace which is capable of satisfactorily performing a recarbonization treatment even if a large number of works are piled up in bulk and contacted with each other.

DISCLOSURE OF INVENTION

This invention has been accomplished under the circumstances as explained above and therefore, an object of the present invention is to provide a continuous annealing furnace which is capable of performing a recarburization of decarbonized layer formed in a hot forging in a stable manner and at a low cost, wherein a continuous annealing is performed by making use of two or more treatment chambers and an intermediate chamber interposed between the treatment chambers and partitioned by means of an openable door from the treatment chambers, the two or more treatment chambers and the intermediate chamber being sequentially connected with each other, and each treatment chamber being filled with a gas atmosphere differing in carburizing property from that of the other chambers.

Another object of this invention is to provide an annealing method which is featured in that the recarburization is performed by making use of the aforementioned continuous annealing furnace.

Another object of this invention is to provide a roller bearing which is long in life and excellent in workability.

Further object of this invention is to provide, through a combination of optimum working steps, a method for manufacturing an inner ring and an outer ring for a deep groove ball bearing, which are excellent in capabilities as a bearing, the method enabling the manufacturing cost to become as minimum as possible.

(1) This invention provides a continuous annealing furnace for enabling a continuous spheroidizing annealing of a high carbon bearing steel to be performed, the continuous annealing furnace comprising; two or more treatment chambers sequentially connected with each other and respectively filled with a gas atmosphere differing in carburizing property from that of the other chambers; an intermediate chamber interposed between the treatment chambers and partitioned by means of an openable door from the treatment chambers; and transferring means for passing a work piece to be treated through the two or more treatment chambers and the intermediate chamber.

(2) This invention also provides a roller bearing which is formed of a high carbon bearing steel treated as mentioned in the above item (1), and whose finished raceway surface exhibits a maximum carburization ratio of 0.1% (more preferably 5%) to 30% and a carburization depth of 0.1 mm to 0.5 mm.

(3) This invention also provides a method for manufacturing an inner ring and an outer ring for a deep groove ball bearing wherein a grinding work is performed after a heat treatment, the method being applicable to the softening furnace and comprising the steps of; hot-forging a raw round bar thereby to form a rough ring to be worked into an inner ring or an outer ring; softening the rough ring so as to spheroidize carbides contained in the rough ring for a convenience of subsequent cold working or turning working; cold-rolling the rough ring while holding the inner circumferential surface and outer circumferential surface of the rough ring between a mandrel and a roller, thereby enlarging the diameter of the rough ring to form the configuration of the inner ring or the outer ring; turning the diametrally enlarged ring thereby finishing it into a configuration required for a deep groove ball bearing; performing a hardening and a tempering of the ring thereby to obtain a hardness required for a bearing; and grinding the raceway surface and fitting surface of the ring.

(4) This invention also provides a method for performing a continuous spheroidizing annealing of a high carbon bearing steel, which is characterized in that the annealing is performed by passing a work piece to be treated through an annealing furnace comprising two or more treatment chambers sequentially connected with each other and respectively filled with a gas atmosphere differing in carburizing property from that of the other chambers, an intermediate chamber interposed between the treatment chambers and partitioned by means of an openable door from the treatment chambers.

BRIEF DESCRIPTION OF DRAWINGS

FIG. 4 shows a cross-sectional view explaining sequentially the steps after the hot forging step in conformity with the steps shown in FIG. 1 of the present invention;

FIG. 5 is a plan view explaining a cold rolling work (CRF working);

FIG. 6 is a graph explaining the feature of the magnitude of decarburization after a hot forging according to the prior art;

FIG. 7 is a graph explaining the feature of the magnitude of decarburization after a hot forging according to the present invention;

FIG. 13 is a graph explaining a relationship between the value of an oxygen sensor and the surface decarburization ratio under various annealing conditions;

FIG. 14 is a graph explaining the feature of the magnitude of decarburization after the non-oxidizing annealing according to the present invention;

FIG. 15 is a graph explaining the feature of the magnitude of decarburization after the non-oxidizing annealing+after the hardening according to the present invention;

FIGS. 30A to 30C illustrate respectively a portion of a forged ring for an outer ring of 6206 bearing, to which the measurement was performed; and FIG. 31 shows a graph explaining a relationship between the ratio of partial pressure: $(CO)^2/CO_2$ at the period of annealing and the ratio of partial pressure: $(CO)^2/CO_2$ at the period of carburization in an annealing method according to the present invention.

BEST MODE OF CARRYING OUT THE INVENTION

Figure 1:
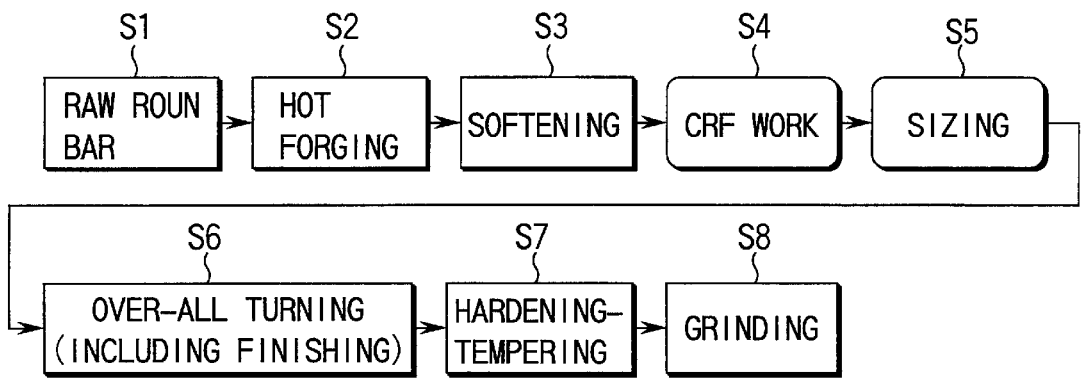
FIG. 1 shows a block diagram explaining, in sequence of steps, the method of manufacturing an inner ring or an outer ring of a deep groove ball bearing according to the prior art.

This invention will be further explained in detail as follows.

1. Method of Manufacturing an Inner Ring and an Outer Ring of a Deep Groove Ball Bearing The present inventors have performed a profound study on the manufacturing cost of the inner and outer rings of a steel deep groove ball bearing which will be produced through a grinding work after a heat treatment, including the costs for the raw material thereof and for each manufacturing step in various manufacturing methods thereof, and have obtained the following results.

1-1. The deep groove ball bearing is mostly formed of a bearing which is generally called "normal size" having an outer diameter ranging from about 20 mm to 200 mm and which is mass-produced at low cost. Therefore, as compared with the heat treatment and shot in which a large number of bearings can be concurrently treated, the reduction in number of steps in the grinding work or turning work in which the bearing has to be treated one by one is much effective in reducing the manufacturing cost.

1-2. Since the bearing is mass-produced, an improvement in the yield of material is also effective in lowering the cost. Therefore, to minimize the forging blank by making use of the CRF working or to reduce the magnitude of turning by forming a groove on the raceway surface is effective in lowering the cost.

1-3. With respect to the high-precision CRF working for completely finishing the raceway surface groove or sealing groove, to perform the turning work after the CRF is more effective in lowering the cost, in view of the cost for a full surface turning in the state of blank before the CRF working, in view of the problem of cracking, or in view of an increase in cost due to the prolonging of working time.

Namely, it has been found in the analysis of the manufacturing cost of the bearing that an optimum result can be obtained by adopting measures wherein the CRF working is employed, the turning work is not performed prior to the CRF working, and the number of turning work after the CRF working is reduced as much as possible. Therefore, in the following embodiments, the turning work is not performed prior to the CRF working, the turning work after the CRF working is examined with respect to the manufacturing cost, and at the same time, the capability of the resultant bearing is confirmed.

However, in view of the quality and capability of the bearing, the magnitude of turning and the number of turning step cannot be simply reduced. Further, it is impossible to expect a sufficient reduction of the manufacturing cost by simply reducing the magnitude of the turning.

When a hot forging is performed in the manufacturing steps of the inner or outer ring of a deep groove ball bearing, a pearlite structure is developed in most cases, though it may depend on the cooling rate and on the alloy components of raw material, thus badly affecting the following steps such as turning. It is therefore required that not only the hardness of the raw material is reduced but also the microstructure thereof is improved. In the case of bearing steel (SUJ2) which has been most popularly employed for the manufacture of a bearing and contains 1% of carbon is generally subjected to a spheroidizing annealing.

Namely, when a raw material is subjected to a hot forging wherein the raw material is heated up to 1,100 to 1,200° C. and molded by way of upsetting, or subjected to an annealing wherein the raw material is heated up to 750 to 800° C. and heat-treated for 10 to 20 hours, an oxide layer or decarburized layer is caused to be generated on the surface of the resultant rough ring. If this oxide layer or decarburized layer is caused to remain on the surface of the finished bearing, the capabilities of the bearing such as life and abrasion are deteriorated. Namely, unless the oxide layer or decarburized layer on the surface of the CRF ring is reduced prior to the turning work, the reduction in magnitude of grinding or the reduction in number of turning steps cannot be realized.

When the oxide layer or decarburized layer is left almost as it is on the surface of the CRF ring which has been diametrally enlarged by means of the CRF working but has not yet been subjected to a turning work, and hence, the oxide layer or decarburized layer is left on the surface of the finished bearing, the capabilities of the bearing such as the life and abrasion of the bearing are caused to deteriorate. In view of this problem, the surface of the CRF ring is required to be entirely subjected to a turning work so as to remove the decarburized layer.

Under the circumstances, the present inventors have investigated in detail about the quantity of decarburization in the raw material and at each manufacturing step in the ordinary manufacturing method of a deep groove ball bearing involving the CRF working as shown in FIG. 1. In this case, a bearing steel (SUJ2) which has been most popularly employed conventionally for the manufacture of a bearing was employed. The investigation of the quantity of decarburization was performed by measuring the characteristic X-ray of carbon in an X-ray analysis of the cross-section of a sample. In this measurement, an X-ray measuring apparatus (tradename; EPMA-1600; Shimazu Seisakusho) was employed.

As for the raw material, a raw round steel bar which has been rolled and is generally advantageous in terms of cost was employed. Therefore, during the process starting from the production of steel to the rolling step, a decarburization is already generated more or less. Then, the results of measurement of the maximum decarburization quantity after the hot forging are shown in FIG. 6. In this FIG. 6, the abscissa denotes a distance (mm) from the surface of the raw material, and the ordinate represents the concentration of carbon (weight %) (the same in the following FIG. 7). The decarburization is caused to increase when the raw material is heated up to 1,100 to 1,200° C. at the occasion of hot forging and while the raw material is molded by way of upsetting.

When the quantity of decarburization was measured at various portions of a rough ring (forged ring) after a hot forging, non-uniformity in magnitude of decarburization was admitted depending on the location measured. Namely, since the magnitude of decarburization was found prominent at the peripheral wall of the outer ring and of the inner ring (9 and 10 in FIG. 4(D)), one of the reasons for this non-uniformity in magnitude of decarburization may be attributed to an accumulation of decarburization originating from that of the raw material. FIG. 4 illustrates a hot forging process where the CRF working is incorporated therein. A decarburization was recognized at the outer circumferential portion 11a of the raw round bar 11 shown in FIG. 4(A). When this raw round bar 11 was subjected to a hot forging, the resultant forged rings 5 and 6 shown in FIG. 4(D) indicated an increased magnitude of decarburization due to the accumulation of decarburization including that of the raw material. In particular, there was a tendency that a great extent of decarburization is left remained at the central portion of the outer peripheral surface 9 which corresponds to the outer circumferential portion of the outer ring.

Further, the present inventors have also investigated the magnitude of decarburization at various location of the outer peripheral wall of the ring, finding that, even at the central portion of the outer peripheral surface 9 where a maximum decarburization was admitted, there was a non-uniformity in magnitude of decarburization along the circumferential direction thereof.

Therefore, if the reduction in magnitude of grinding or the reduction in number of steps is to be realized without giving a bad influence to the quality of the resultant bearing, these reductions should be performed by controlling this maximum magnitude of decarburization. Accordingly, the value of measurement obtained in the following steps will be indicated by a maximum magnitude of decarburization.

FIG. 7 shows the results measured of the magnitude of decarburization after the annealing step in a nitrogen atmosphere that is usually performed in the treatment of a bearing which is generally called "normal size". Although the heating temperature employed in the annealing was as low as 750° C. to 800° C., the total processing time was as long as 10 to 20 hours, thereby resulting in a big increase in the maximum magnitude of decarburization. Namely, it has become clear that the main reason for the generation of decarburization in the normal size ball bearing can be ascribed to the annealing step. However, the magnitude of decarburization in the annealing step depends greatly on the annealing atmosphere among the various annealing conditions.

In the meantime, there is known an air atmosphere annealing where any specific atmosphere is not employed as one of the methods for manufacturing a bearing. In this case, the surface of the bearing is prominently oxidized and decarburized resulting in a roughened surface. Therefore, the surface oxide layer has to be removed at first by means of shot peening or shot blasting, and then, the turning work has to be performed to a large extent so as to cut away the surface layer including the decarburized layer. Therefore, in the case of the normal size ball bearing which is to be mass-produced, the annealing thereof is frequently performed in a nitrogen atmosphere with a view to save the total manufacturing cost and to reduce the magnitude of turning.

However, even if the annealing is performed in a nitrogen atmosphere, it is impossible to sufficiently inhibit the decarburization of the surface of bearing as shown in FIG. 7. Namely, it is only possible to reduce the magnitude of turning more or less as compared with an air atmosphere annealing, thus ultimately requiring a total surface turning work to remove the decarburized layer after the annealing.

When the quantity of decarburization in a ring forged after the annealing was measured at various portions thereof, non-uniformity in magnitude of decarburization was admitted depending on the location measured as in the case where the measurement was performed after the forging. Namely, the magnitude of decarburization was found prominent at the peripheral wall of the outer ring, indicating an accumulation of decarburization originating from that of the raw material, thus indicating a tendency of increasing the non-uniformity in magnitude of decarburization.

Although it may be possible, by the employment of an nitrogen atmosphere in the annealing, to omit the step of removing a surface oxide layer and to reduce the decarburized layer more or less as compared with the air atmosphere annealing, it is still difficult to substantially reduce the number of turning step. Moreover, a non-uniformity in magnitude of decarburization may be caused to generate, thus resulting in the formation of a decarburized layer having a maximum depth of about 0.5 mm as shown in FIG. 7.

Figures 8, 9:
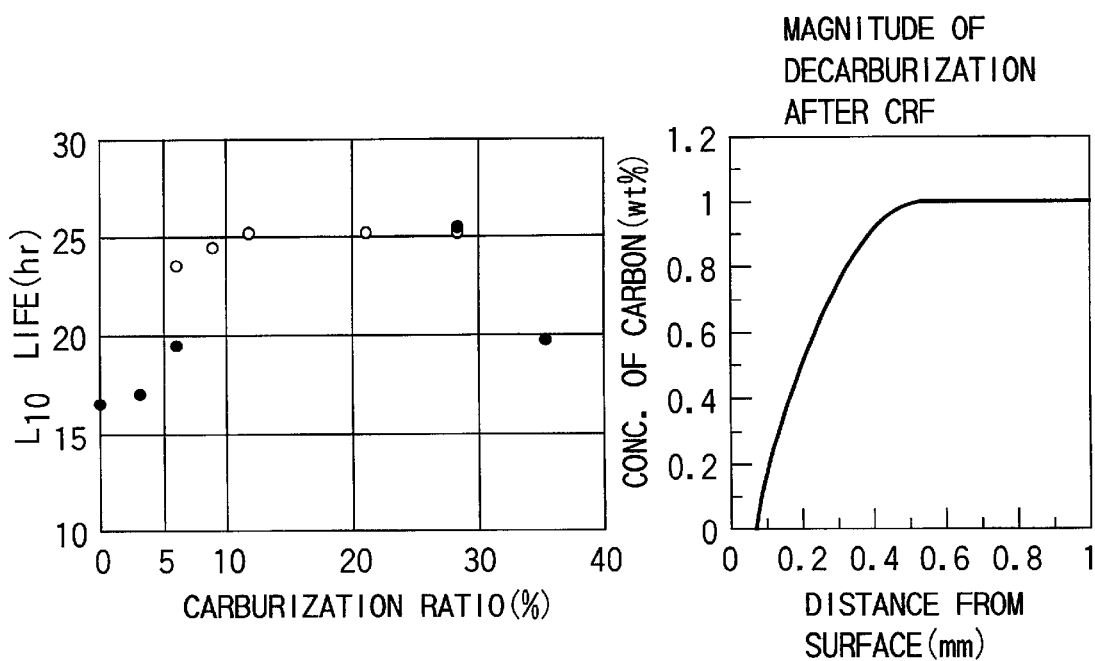
FIG. 8 is a graph explaining a relationship between the carbonization ratio and L10 life according to the present invention.
FIG. 9 is a graph explaining the feature of the magnitude of decarburization after the CRF according to the present invention.

FIG. 9 shows the results measured of the magnitude of decarburization after the CRF step. Although the decarburization layer was minimized more or less due to the rolling thereof by the CRF working, any substantial change in magnitude thereof was recognized.

Figures 10, 11:
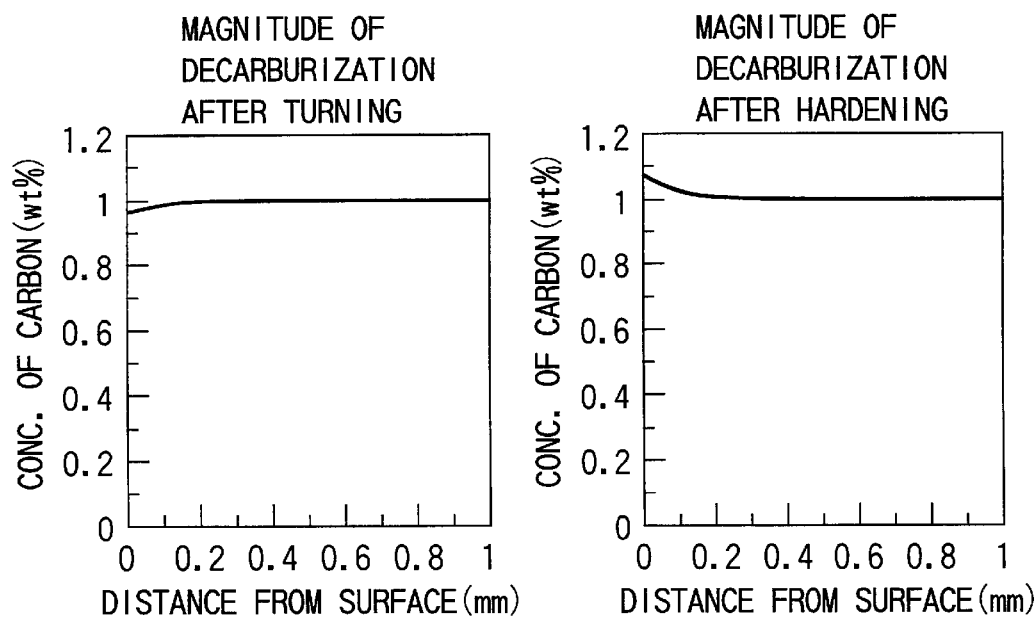
FIG. 10 is a graph explaining the feature of the magnitude of decarburization after the turning work according to the present invention.
FIG. 11 is a graph explaining the feature of the magnitude of decarburization after the hardening according to the present invention.

FIG. 10 shows the results measured of the magnitude of decarburization after the total surface turning work. Although the magnitude of turning was varied depending on the size of the bearing, the magnitude of turning was about 0.5 to 1.0 mm at the outer circumferential portion of the outer ring exhibiting a large magnitude of decarburization, thus removing most of the decarburization layer.

FIG. 11 shows the results measured of the magnitude of decarburization after the hardening and tempering steps. The hardening and tempering steps were performed under the conditions: after a sample was heated at a temperature of 830° C. to 860° C. for 0.5 to 1.0 hour, the sample was subjected to an oil hardening, and then, the sample was subjected to a tempering at a temperature of 150° C. to 200° C. for 90 to 120 minutes. Since the hardening is generally performed in a carburizing atmosphere (RX gas) with a view to prevent the decarburization, the surface of the sample can be carburized. However, since the treatment time is relatively short, the depth of carburization would be somewhere between 0.1 and 0.2 mm.

Although the magnitude of grinding may be varied depending on the size of the bearing, the magnitude of grinding may be about 0.1 to 0.2 mm at the outer circumferential portion of the outer ring (since the surface layer portion 0.1 to 0.2 mm in thickness as measured from the surface shown in FIG. 11 is removed), thus removing most of the carburized layer (recarburized layer) formed in the hardening.

It has been found, as a result of detailed investigation on the features of oxidation and decarburization in the raw material and at each manufacturing step of a deep groove ball bearing, that, as far as the manufacturing steps are concerned, the main cause for the decarburization can be ascribed to the annealing step even if the annealing is performed in a nitrogen gas atmosphere, and that since the carburized layer is removed after the turning work and the recarburized layer is removed by the hardening step, the generation of any defectives in surface of the bearing such as decarburization would not be brought about in the subsequent manufacturing steps.

Then, with a view to minimize the decarburization in the annealing step which is a main cause for the decarburization, various experiments were performed by taking notice of the quantity of oxygen remaining in the furnace that causes the oxidation or decarburization to proceed. The annealing was performed for 12 to 15 hours under the conditions of 760 to 800° C. in temperature, wherein a very little amount of propane gas was added to the nitrogen gas atmosphere in order to control the quantity of residual oxygen in the furnace. The measurement of oxygen quantity was performed using a direct inlet type oxygen sensor (CP-D) (available from NGK).

This oxygen sensor is designed such that when a zirconia dielectric body thereof disposed to partition air atmosphere from the atmosphere inside the furnace is exposed to a high temperature, an electromotive force is generated due to a difference in oxygen partial pressure ("USC type carbon sensor control system", The forging of castings, 1978, 7, pp. 77). When the oxygen partial pressure of air atmosphere is assumed as being 0.21(atm) and the oxygen partial pressure in the furnace is defined by $PO_2$(atm), this electromotive force "E" (mV) can be expressed by the following equation;

$$E = 0.0496 \times T \times \mathrm{Log}(0.21/PO_2)(\mathrm{mV}) \tag{1}$$

("The control of an atmosphere in a bright heat treatment furnace by means of a furnace atmosphere sensor", Metals, an extra-edition, 1979, 4, pp. 112).

FIG. 13 shows a relationship between the value (mmV) of an oxygen sensor and the surface decarburization ratio "D" (%) under various annealing conditions. This surface decarburization ratio is a rate of change in quantity of surface carbon before and after the annealing step, and can be expressed by the following equation;

$$D = \{\text{quantity of surface carbon (\%) before annealing} - \text{quantity of surface carbon after annealing}\}/\text{quantity of surface carbon (\%) before annealing} \times 100(\%) \tag{2}$$

Figure 12:
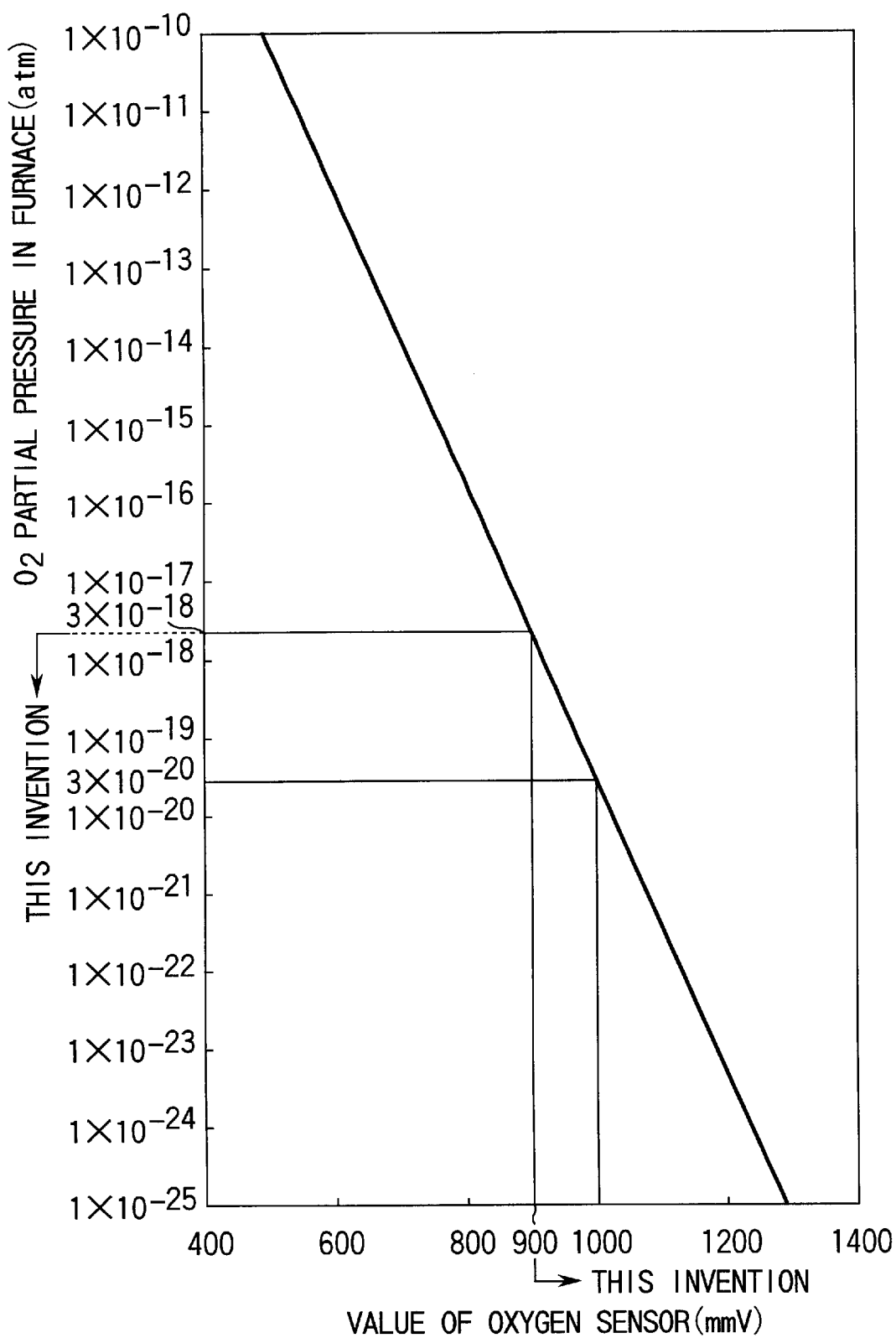
FIG. 12 is a graph explaining a relationship between the value of an oxygen sensor and the partial pressure of oxygen in the furnace at the annealing temperatures.

When the value of the oxygen sensor becomes 900 mmV ($2.6 \times 10^{-18}$ atm) or more, the magnitude of decarburization decreases, and when the value of the oxygen sensor becomes more than 1,000 mmV ($3.4 \times 10^{-20}$ atm), the decarburization would not be recognized in the annealing step. On the other hand, FIG. 12 shows a relationship between the value of an oxygen sensor and the partial pressure (atm) of oxygen in the furnace at the annealing temperature of 800° C. as shown in the aforementioned equation (1). Therefore, in order to reduce or vanish the quantity of decarburization, the value of the oxygen sensor is required to become 900 mmV or more, i.e. the quantity of oxygen remaining in the furnace should preferably be $3 \times 10^{-18}$ atm or less.

According to FIG. 13, when the value of the oxygen sensor becomes 1,000 mmV or more, the ratio of surface decarburization becomes minus. This means that when the residual oxygen is reduced, the quantity of decarburization is vanished. Since the carbon in the surface layer does not vanished out, and the carbon existing inside diffuses into a surface region where the concentration of carbon is low, there has been recognized a phenomenon wherein the decarburized surface carbon at the occasion of hot forging tends to be somewhat alleviated. FIG. 14 shows a result of measurement of the magnitude of decarburization when the annealing was performed where the value of the oxygen sensor is 1,050 mmV ($3.9 \times 10^{-21}$ atm). As compared with FIG. 6 where the measured results after the hot forging are shown, the quantity of surface carbon is increased due to the diffusion of carbon. Accordingly, in order to sufficiently increase the magnitude of alleviation of decarburization, the value of the oxygen sensor should desirably be 1,000 mmV or more, and the oxygen partial pressure inside the furnace should desirably be $3 \times 10^{-20}$ atm or less.

FIG. 15 shows a result of measurement of the magnitude of decarburization when the hardening and tempering were directly performed. It has been found that since the carburization is effected down to a depth of 0.1 to 0.2 mm at the step of hardening, decarburization can hardly take place even at the outer circumferential portion of the outer ring where the decarburization usually becomes maximum. However, there was generally recognized a decrease in concentration of carbon at a depth of about 0.3 mm from the surface (which is away from the recarburization region and disposed closer to the core side), thus indicating a trace of decarburization at the surface region as shown in FIG. 15.

As explained above, as a result of detailed investigation on the features of decarburization in the raw material and at each manufacturing step of a deep groove ball bearing, it has been found that, as far as the manufacturing steps are concerned, the main cause for the decarburization can be ascribed to the annealing step even if the annealing is performed in a nitrogen gas atmosphere, and that unless the decarburization is prevented, it is impossible to greatly reduce the manufacturing steps.

It has been found according to this invention that when the residual oxygen in the furnace is minimized by the addition of a hydrocarbon gas such as propane gas to a nitrogen gas atmosphere, not only the decarburization that takes place prominently at the occasion of annealing can be suppressed, but also the decarburization that takes place at the occasion of hot forging can be alleviated to some extent, so that the capability of recarburization of the surface region can be ensured depending on the quantity of residual oxygen. Accordingly, it has been found that if a recarburization effect of the subsequent hardening step is incorporated, it is possible to obtain a bearing exhibiting a satisfactory quality even at the outer circumferential portion of the outer ring where the decarburization becomes maximum in general.

In this case, the expression of "the decarburization that takes place at the occasion of hot forging can be alleviated to some extent" means an effect of spontaneously alleviating the decarburization through a diffusion of carbon existing in the interior of material, which can be brought about by the prevention of decarburization.

Figure 20:
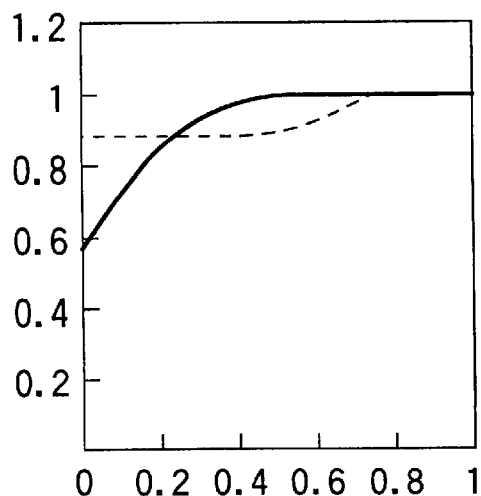
FIG. 20 is a graph explaining a relationship between a distance from the surface of a work piece and the concentration of carbon when a hydrocarbon-based gas is added to a nitrogen atmosphere in a hot forging step according to the present invention.

FIG. 20 shows the results measured of the maximum quantity of decarburization after a forging, which are indicated by a solid line, and also the results obtained when a vacuum annealing which is free from decarburization or from recarburization was performed after the forging, the results being indicated by a broken line. These results indicate that when the addition or deletion of carbon in relative to the surface of raw material does not take place, the carbon in the raw material diffuses at the occasion of annealing, thus alleviating the decarburization of the surface of raw material.

Namely, by reducing the residual oxygen in the furnace as much as possible at the occasion of annealing step, the decarburization of the surface of the inner or outer ring after the tempering can be substantially vanished, so that the turning work of the inner diameter of the inner ring or the outer diameter of the outer ring after the CRF working can be eliminated.

The reason for limiting the oxygen partial pressure of the atmosphere in the annealing furnace to $3 \times 10^{-18}$ atm or less is as follows. Namely, as mentioned above, in order to prevent the decarburization at the occasion of annealing and at the same time, to alleviate the decarburization to some extent at the occasion of hot forging, the residual oxygen in the furnace should be controlled to $3 \times 10^{-18}$ atm or less, and desirably to $3 \times 10^{-20}$ atm or less in view of sufficiently alleviating the magnitude of decarburization at the occasion of hot forging.

According to this invention, the following effects (1) to (4) can be obtained.

(1) A Turning Work can be Dispensed With Prior to the CRF Working

The high-precision CRF for completely finishing the raceway surface groove or the sealing groove is required to be performed by way of an over-all turning in order to administer the dimension and weight in particular of the ring prior to the subsequent working thereof. Therefore, although the turning shape may be simple, the cost for the turning will be increased which is comparable to that of finishing turning after the CRF working. Further, even in the case of the manufacturing method involving the CRF working shown in FIG. 1, the turning work of the end face for removing a flash formed at the end face after the CRF working may be occasionally performed. However, according to the method of this invention, since the number of steps of turning work where the bearing is required to be treated one by one is reduced as much as possible, the turning work prior to the CRF working can be eliminated.

(2) The CRF Working can be Performed by Means of a Near-net System Where the Outer Diameter Thereof is Configured Into a Predetermined Approximate Shape FIG. 4(E) illustrates a shape after the CRF working according to this invention. Since the decarburization does not substantially take place after the annealing in this invention, the magnitude of turning after the CRF can be minimized. Therefore, the raceway grooves 7a and 8a shown in FIG. 4(E) which constitute the raceways of the inner and outer rings, respectively, can be formed into a configuration which is more close to that of a finished product as compared with the groove to be formed according to the conventional CRF working. However, if these grooves are to be finished too precisely, the time for the CRF working may be excessively prolonged. Accordingly, in this invention, the CRF working is performed by means of a near-net system where the shape thereof is formed into an approximate shape which is then optimized in the following finishing turning work.

(3) The Outer Circumferential Surface can be Finished Into a Predetermined Dimension and Shape by Means of Sizing Since the CRF ring is diametrally enlarged by means of rolling, it is impossible to obtain a perfect circularity.

Figure 16:
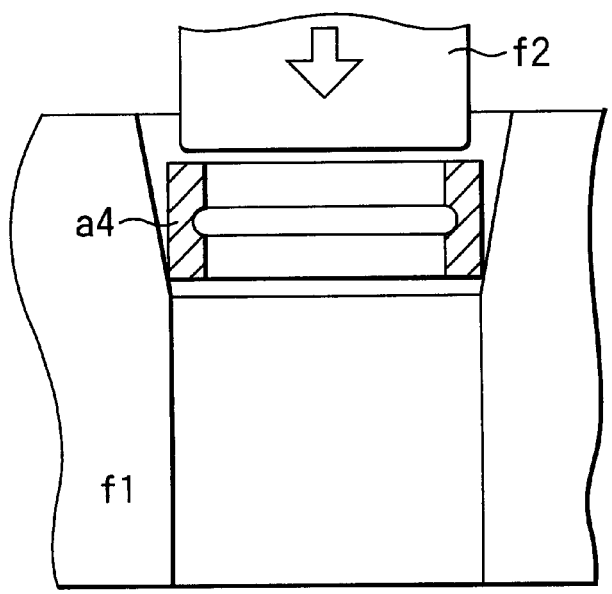
FIG. 16 is a schematic cross-sectional view explaining the sizing work according to the present invention.

Accordingly, the CRF ring is finished into a predetermined circularity and dimension by means of sizing work. FIG. 16 shows a schematic view illustrating the sizing work. One side of a mold f1 is tapered, and a CRF ring a4 is pushed in from this tapered side by making use of a cylinder f2.

When the CRF ring a4 is pushed into the straight portion of the mold f1, an excellent circularity can be obtained and at the same time, the external configuration can be shaped to match with a predetermined dimension.

According to the prior art, even if the external dimension is finished by means of sizing so as to obtain an excellent circularity, since a turning work is subsequently performed so as to remove the decarburization layer, the finished configuration may be greatly deformed on the contrary due to the chuck at the occasion of turning work.

However, since the decarburization is not substantially generated after the annealing according to the method of this invention, it is unnecessary to dispense with the turning work of the outer circumference of the outer ring that is to be subjected to a direct sizing.

On the other hand, in the same manner as in the case of the outer ring, it is possible, by pushing a mold into the inner circumferential portion of the inner ring, to obtain an excellent circularity of the inner ring. At the same time, since the dimension of the inner circumferential dimension can be shaped to match with a predetermined dimension, the turning work of the inner circumference of the inner ring can be omitted as long as the generation of decarburization can be prevented.

(4) It is Simply Required That the Portion Which Cannot be Completely Finished by Means of the CRF Working is Suitably Shaped, and the Turning Work of the Inner Circumferential Surface of the Inner Ring and of the Outer Circumferential Surface of the Outer Ring can be Dispensed With Since the decarburization in the annealing step can be minimized and the sizing is performed subsequent to the near-net CRF, it is possible to dispense with the turning work of the inner circumferential surface of the inner ring and of the outer circumferential surface of the outer ring. Additionally, it is possible to greatly reduce the magnitude of the turning work of the raceway surface and of the sealing groove.

When the CRF ring is to be subjected to an over-all turning in general, 8 to 10 steps are required in total for the treatment of both inner ring and outer ring. Further, since the turning work is required to be performed while chucking the ring, it is impossible, in this over-all turning, to simultaneously perform the turning of all of the external configuration and the inner circumferential surface of the ring. Namely, the ring is required to be re-chucked several times in the turning work.

Since the turning work of the inner circumferential surface of the inner ring and of the outer circumferential surface of the outer ring can be eliminated according to the method of this invention, it is possible to reduce the number of re-chucking of the ring. Furthermore, since the magnitude of cutting can be reduced, the time required for turning the raceway surface can be also minimized. Namely, since the steps of the turning work in which the bearing has to be treated one by one can be reduced, it is possible to greatly reduce the manufacturing cost, and at the same time, the yield of the raw material can be also enhanced.

In the meantime, the present inventors have also investigated the influence of a carburization layer in the manufacturing method where the magnitude of decarburization is prominent in the raw material or at the hot forging step, or in the manufacturing method where not only the concentration of oxygen in the furnace is reduced but also a suitable amount of a carburizing gas such as RX gas is introduced into the furnace so as to perform the annealing in a carburizing atmosphere. More specifically, the present inventors have investigated the influence of the magnitude and depth of a carburization layer on the capabilities of bearing as well as on the productivity including the workability of the bearing, and obtained the results as explained below.

(1) When the carburization layer remaining on the raceway surface of a finished bearing is increased, the quantity of residual austenite after a hardening is increased, and at the same time, the residual compressive stress is also generated, thus indicating a tendency to prolong the life of the bearing. In particular, a bearing of surface-originating type where an inconvenience at the market is simulated indicated a tendency to prominently prolong the life thereof.

(2) When the carburization layer on the surface of a forged ring is increased to more than required, the hardness of the bearing becomes too high even after the annealing thereof, thus greatly deteriorating the workability thereof. In particular, at the occasion of the CRF working which is a strong cold working, not only the mandrel is worn but also is caused, in some case, to invite an early destruction.

(3) When the concentration of carbon is excessively increased in the carburizing gas atmosphere at the occasion of annealing, a large amount of soot is generated in the furnace, thereby deteriorating the carburizing capacity in the annealing step. As a result, a periodic maintenance of the interior of the furnace (burn-out) is required, thus deteriorating the productivity.

It has been found, as a result of investigation regarding the influence of the carburizing conditions at the occasion of annealing on the capabilities of the bearing or on the productivity including workability, that there is an optimal condition which enables the inherent annealing effect for softening a raw material to be exhibited and at the same time, which does not deteriorate the workability of a raw material.

Namely, since the magnitude of cutting-off in the turning step or grinding step is minimized to a limit, not only the oxygen content in the furnace is minimized at the occasion of annealing, but also the recarburization is required to be performed. However, if this recarburized layer is left remained to such a degree as to prevent the productivity including the workability from being deteriorated, it is possible to prolong the life of the inner and outer rings. Namely, by optimizing the recarburizing annealing treatment, the effect of reducing the manufacturing cost due to a reduction of cutting-off and the prolonging of life can be simultaneously achieved.

In this invention, the annealing step should preferably be performed in a carburizing atmosphere. The reasons for this is as follows. Namely, in order to omit or greatly reduce the number of step for performing the finishing turning work after the CRF working, and at the same time, in order to realize the effect of prolonging the life by way of recarburization, the oxygen content in the furnace is simply reduced without performing the annealing in a carburizing atmosphere. This is preferable for the purposes of preventing the generation of carburization at the occasion of annealing and for the purpose of recarburizing the decarburized portion that has been formed at the occasion of hot forging. Namely, the carburized layer should preferably be left remained.

However, if this carburized layer is increased more than required, it may lead to the generation of a large amount of deposition on the surface of forged ring, or to an increased hardness of the surface of forged ring, thus badly deteriorating the workability of raw material. On the other hand, an attempt to simply prevent the generation of decarburization at the occasion of annealing is not enough, so that the decarburization may be partially left remained or the carburization of the ring may become insufficient. If the carburization layer is not sufficiently ensured, the effect of prolonging the life may not be obtained. Therefore, a suitable degree of recarburization is required to be performed using a suitable carburizing atmosphere at the occasion of annealing.

It is desired in this invention not to perform the turning work of the inner circumferential surface of the inner ring and of the outer circumferential surface of the outer ring at the occasion of the finishing turning work after the cold rolling step, and to eliminate the turning work of the groove of the raceway surface or of the sealing groove. The reasons for this are as follows.

Namely, since a suitable degree of carburized layer is left remained on the surface of forged ring which has undergone a recarburizing treatment, this suitable degree of carburized layer is also left remained after the CRF working. Therefore, it is no more required to perform a turning work which has been conventionally performed for removing a decarburized layer after the CRF working.

However, as mentioned above, if a complicated shape such as the sealing groove is to be subjected to a high precision CRF working, a relatively long time may be required for the working thereby extremely increasing the cost for the CRF working. Therefore, it is desired according to this invention that the inner circumferential surface of the inner ring and the outer circumferential surface of the outer ring, which can be satisfactorily shaped by means of a speedy CRF working, are not subjected to the turning work, and the raceway surface groove or the sealing groove which are rather complicated in configuration are subjected to a shaping through a near-net system thereby performing the finishing work of the grooves, thus eliminating the turning work to a limit without paying attention to a residual decarburized layer. Further, depending on circumstances, the turning work of the groove portions (7a and 8a in FIG. 4E) may be omitted, thus performing the finishing work of these groove by way of only a grinding work after the hardening and tempering steps.

It is preferable in this invention that the finished raceway surface of bearing exhibits a maximum carburization ratio of 5% to 30% and a carburization depth of 0.1 mm to 0.5 mm. The reasons for this is as follows. Namely, the inner circumferential surface of the inner ring and the outer circumferential surface of the outer ring are required to be excellent in anti-fretting property or in abrasion resistance in relative to the engagement thereof with a shaft or a housing. If the maximum carburization ratio of the finished bearing is confined within the range of 5% to 30% as defined by this invention, the turning work of the inner circumferential surface of the inner ring and of the outer circumferential surface of the outer ring can be omitted, thus expectedly rendering these surfaces to have a higher carburization ratio as compared with that of the raceway surface. Therefore, since the surface hardness of the inner circumferential surface of the inner ring and of the outer circumferential surface of the outer ring becomes higher as compared with that of the conventional ring, an excellent residual compression stress can be obtained, thus naturally making it possible to improve the anti-fretting property and abrasion resistance thereof.

In this invention, the surface carburization ratio (E) denotes a maximum ratio of change in carbon content of the finished surface in relative to the carbon content of raw material, and can be expressed by the following formula.

$E=\{$(the surface carbon content on a finished surface (%)–the carbon content of a raw material (%))/the carbon content of a raw material (%)$\}\times 100$(%)

In the meantime, it has been found, as a result of investigation regarding the state of damage in the normal size ball bearings that have been generally employed in the industries, that most of them are suffered from a surface damage type fatigue (for example, the abrasion due to roughness or poor lubrication, or a damage due to a peeling). Namely, the ball bearings which are considered as being employed in a clean lubricated condition are employed under the conditions where the uppermost surface of the raceway is actually contaminated by the penetration of dusts and foreign matters. In particular, when the bearing is employed under severe conditions where the life of bearing is considered as being important, the damage from the surface of bearing (a damage prior to peeling) can be often admitted.

Therefore, tests were performed by changing the surface carburizing ratio and using a lubricating oil mixed with a foreign matter which may cause a surface-originating type damage (a damage to be brought about due to poor lubrication or to foreign matters) to the bearing workability. The results obtained are shown in FIG. 8. As seen from FIG. 8, when the carburization ratio is 5% or more, the effect thereof to prolong the life can be apparently recognized. However, if the carburization depth is less than 0.1 mm, it is difficult to obtain a sufficient residual compression stress, thus deteriorating the effect thereof to prolong the life even if the carburization ratio is 5% or more.

Meanwhile, it has been found as a result of investigation made regarding the workability after the recarburizing treatment that where the carburization ratio is more than 30%, the workability would be badly deteriorated. Whereas, even if the carburization ratio is not more than 30%, if the depth of carburization is more than 0.5 mm, the workability of CRF which will be influenced in particular by the plastic deformation of the surface would be badly deteriorated.

Therefore, it is preferable as mentioned above that the finished surface of bearing exhibits a maximum carburization ratio of 5% to 30% and a carburization depth of 0.1 mm to 0.5 mm. However, if it is desired to obtain a sufficient effect of prolonging the life, the maximum carburization ratio should be controlled to 10% to 30%.

In this regard, it has been confirmed, as a result of studies made regarding the heat treatment for the recarburization at the occasion of annealing, that the spheroidizing annealing (which is generally performed by a step of heating a work piece up to a point immediately over the Al transformation temperature thereof, and then, followed by a step of gradually cooling the work piece) can be optimized by rendering only the atmosphere to turn into a relatively low carburizing atmosphere.

The carburizing treatment is generally performed such that a work piece is treated at a high temperature of about 900 to 950° C. thereby turning steel thereof into a state of austenite and causing carbon therein to solid-solubilize and diffuse. Further, the carbon potential (hereinafter, referred to as CP value) that determines the concentration of carburization can be stably controlled to a high level. On the other hand, if the treatment temperature is lowered, the diffusion of carbon may become slow, and hence, the carburization depth would become shallow. Additionally, since carbides become more likely to be precipitated, a large quantity of pro-eutectoid carbides are caused to be deposited on the surface of the work piece, thus possibly deteriorating the workability and life thereof. Therefore, the carburization is generally performed at relatively high temperatures.

In the case of this invention however, the spheroidizing softening is required to be performed simultaneous with the carburization (recarburization) treatment. Therefore, if a work piece is heated, after being carburized at high temperatures, to a point immediately over the Al transformation temperature thereof, and then, gradually cooled so as to perform a recarburizing annealing, even if the recarburization may be fully effected, the annealing time for softening would be excessively prolonged, the workability would be deteriorated due to an insufficient spheroidization of carbides, or the surface carburization ratio would be excessively increased due to an excessive solid-solubilization of carbon in the high temperature treatment.

Further, since the annealing has been conventionally performed using a continuous furnace, a sharp change in temperature in a midway of the furnace is undesirable in view of the structure of the furnace as well as in view of possibilities to deteriorate the stability of the controlling of atmosphere and of quality of the product.

Next, the present inventors have conducted an experiment wherein a work piece was heated up to a point immediately over the Al transformation temperature thereof, and after this level of temperature was kept for a while, subjected to an annealing under the conditions wherein only the atmosphere was modified without changing the temperature and the treatment time that have been conventionally employed.

When the temperature for the carburization was set to a very low temperature of 750 to 800° C. or the annealing temperature of SUJ2, a large quantity of pro-eutectoid carbides are caused to be deposited on the surface of the work piece if the CP value becomes excessively high. Additionally, a large quantity of soot was caused to generate in the furnace, thus deteriorating the stability of the controlling of atmosphere and of quality of the product.

It has been generally considered that, when the CP value was set to a low level, it would be difficult to obtain a carburized layer having a sufficient depth since the carburization is performed at low temperatures and at the same time, the concentration for the carburization is decreased. As a matter of fact however, it was found possible, even if the CP value was set to a low level, to stably obtain an excellent results, i.e. a carburized layer having a suitable surface carburization ratio and a depth of about 0.1 to 0.4 mm while making it possible to minimize the generation of soot in the furnace and to stabilize the control of the atmosphere. Furthermore, as mentioned above, although non-uniformity was recognized in the magnitude of decarburization after the hot forging, there was no more recognized any non-uniformity with respect to the magnitude and depth of carburization after the recarburization.

It should be noticed that, as far as the transfer and diffusion of carbon inside the steel are concerned, the diffusion rate becomes extremely fast at the surface and grain boundary of a work piece in general. Further, due to a difference in crystal structure, the diffusion of carbon is faster in austenite than in ferrite ("Metal Data Book", Japan Metal Society, Maruzen Publishing Co., Ltd., 1974, Vol. 20), so that there is a possibility that the diffusion of carburization can be sufficiently expected even at a low temperature. Since the surface of the forged ring which has been partially decarburized is constituted by a binary state consisting of austenite and ferrite due to a heating in the annealing step, the diffusion of carbon can be enhanced at the grain boundary between these phases and inside the ferrite rate in addition to the surface diffusion of carbon, thus assumably making it possible to obtain a sufficient carburization depth even at a low temperature.

Therefore, it is most preferable, in view of production controls such as the setting of equipment of the furnace, a stabilized controlling of atmosphere and the maintenance of the furnace, as well as in view of the workability enabling to produce a stabilized quality and of the capability to obtain a bearing of prolonged life, to employ a method wherein only the atmosphere is adjusted to a relatively low carburizing atmosphere (carbon potential: 0.7 to 0.9%) while retaining other conditions as they are wherein a work piece is heated up to a point immediately over the Al transformation temperature thereof, and then, gradually cooled to perform the annealing thereof.

In this invention, basic experiments were performed using SUJ2 as a raw material. However, as far as a desired quality as a bearing can be obtained through a hardening and a tempering, other kinds of material can be employed. Followings are explanations on such desirable raw materials.

Carbon is an important element for forming a carbide of desirable depth in a bearing. At least 0.8% of carbon content is required for obtaining a sufficient hardness for ensuring a sufficient life and for obtaining a sufficient ratio of the area of carbides. However, if the carbon content exceeds over 1.2%, a macrocarbide may be generated or segregation may become prominent at the occasion of producing steel. Since these macrocarbide and segregation cannot be satisfactorily controlled by means of a soaking treatment which is usually employed for controlling the SUJ2, it would become impossible to sufficiently miniaturizing the carbides in a subsequent warm rolling.

Because of these reasons, the carbon content should preferably be confined within the range of 0.8% by weight to 1.2% by weight.

Si acts as a deoxidant at the occasion of producing steel, and is effective in enhancing the hardenability, in strengthening the martensite base and in prolonging the life of bearing. In order to obtain the aforementioned effects, the content of Si should preferably be at least 0.1% by weight. However, if the content of Si is excessive, the workability thereof including the cuttability and forgeability would be deteriorated. Therefore, the upper limit of the content of Si is at most 0.5% by weight. Due to the aforementioned reasons, a preferable range of the content of Si is 0.1 to 0.5% by weight.

Mn is effective in enhancing the hardenability. In order to obtain the aforementioned effect, the content of Mn should preferably be at least 0.2% by weight. However, Mn also acts to strengthen the ferrite constituting the raw material, so that when the content of carbon is 0.8% by weight or more, the content of Mn should be limited to not more than 1.1% by weight. Because if the content of Mn exceeds over 1.1% by weight, the cold workability of the steel would be badly deteriorated.

Cr is effective in enhancing the properties of base, such as the hardenability thereof and the resistivity to softening in annealing. In order to obtain the aforementioned effects, the content of Cr should preferably be at least 0.1% by weight. However, if the content of Cr exceeds over 1.8% by weight, the generation of a macrocarbide and segregation would become prominent at the occasion of producing steel. Since these macrocarbide and segregation cannot be satisfactorily controlled by means of a soaking treatment which is usually employed for controlling the SUJ2, it would become impossible to sufficiently miniaturizing the carbides in a subsequent warm rolling.

Because of these reasons, the content of Cr should preferably be confined within the range of 0.1% by weight to 1.8% by weight.

2. Roller Bearing

The roller bearing according to this invention, which is formed of a high carbon bearing steel treated as described above, is featured in that the finished raceway surface thereof exhibits a maximum carburization ratio of 0.1% to 30% and a carburization depth of 0.1 mm to 0.5 mm. More preferably range of the maximum carburization ratio is 5% to 30%.

3. Continuous Annealing Furnace and Annealing Method

The present inventors have studied, with a view to minimize the manufacturing cost of bearing, on the treating method which is called a pre-processing of bearing, wherein a raw material is at first subjected to a hot-forging which is followed by a softening by means of spheroidizing annealing, and the resultant raw material is then subjected to a cold working (for example, a turning work or a cold rolling) thereby working the raw material into the configuration of a bearing, and have found out that the reduction in step of the cold working which is a finishing work among this pre-processing of bearing is most effective in saving the manufacturing cost of bearing. However, when this cold working is reduced in step (for example, reduce the magnitude of turning), the decarburization generated in the hot forging step or in the spheroidizing step is left remain, thus giving rise to the generation of a phenomenon where the resultant bearing is ultimately deteriorated.

Therefore, the causes for the decarburization in each step in the pre-processing (the magnitude of decarburization of raw material; the magnitude of decarburization in the hot forging; and the magnitude of decarburization in the annealing) were investigated by the present inventors, finding out that the magnitude of decarburization is most prominent in the spheroidizing annealing step. Namely, in order to reduce the manufacturing cost by reducing the number of step in the finishing step of the pre-processing, it is required to develop a method for minimizing as much as possible the magnitude of decarburization in the spheroidizing annealing step.

Under the circumstances, the present inventors have conducted various experiments with respect to the reduction of decarburization in the annealing step, finding out the following conclusions.

(1) In the case of annealing in a nitrogen atmosphere where only nitrogen gas is introduced into the furnace, oxygen is also caused to be fed to the furnace, so that it is impossible to prohibit the proceeding of decarburization even though the surface of bearing may not be oxidized.

(2) It has been confirmed that it is possible to minimize the content of oxygen in the furnace and to suppress more or less the proceeding of decarburization by adding a very little amount of a hydrocarbon gas such as propane to the nitrogen gas atmosphere. However, it was impossible to completely recarburize a forged product which has been decarburized in the hot forging using a decarburized raw material.

(3) It has been confirmed that it is possible to completely recarburize the raw material by making use of a carburizing atmosphere comprising a carburizing gas such as an RX gas and a very little amount of a hydrocarbon gas such as propane in the annealing step. However, it has been confirmed that it may lead to an excessive carburization, or the generation of soot in the furnace, thus giving rise to a "sooting" phenomenon, and making it impossible to control the atmosphere and difficult to perform the maintenance of the furnace.

Namely, it has been found out that in order to minimize the decarburization thereby to reduce the number of step in the finishing work of the pre-processing, the annealing is required to be performed using a carburizing atmosphere such as an RX gas, but the controlling of the recarburization is very difficult.

Therefore, in order to facilitate the control of recarburization, there may be employed a method wherein the treatment temperature is once raised, and then, a spheroidizing annealing is performed (Japanese Patent Unexamined Publication H2-54717), or a method wherein a recarburization is once conducted in a predetermined carburizing atmosphere, and then, an annealing is performed in a decarburizing atmosphere (Japanese Patent Publication H7-37645). However, a substantial cost down cannot be achieved by these prior arts.

Figure 25:
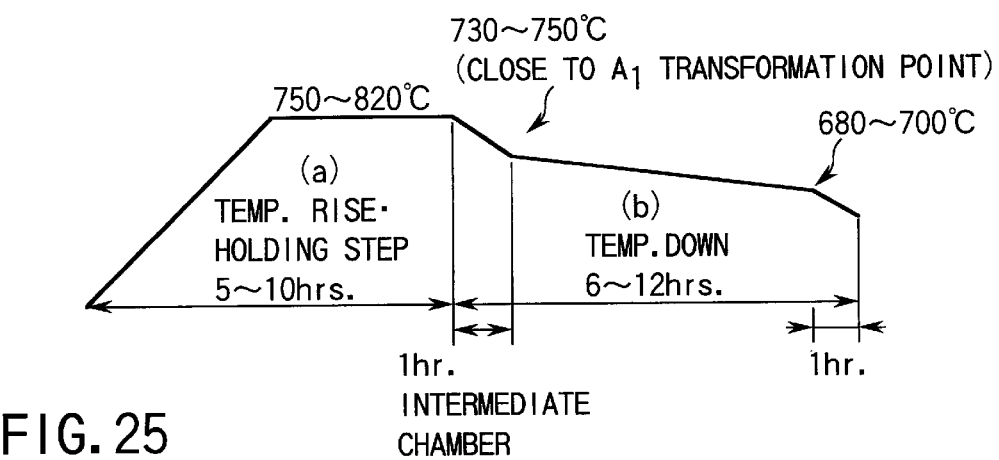
FIG. 25 is a graph illustrating an ordinary heat cycle in the spheroidizing annealing step of a bearing steel (SUJ2)
Figure 26:
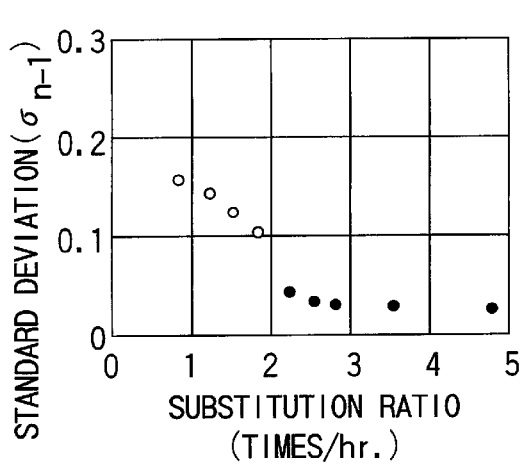
FIG. 26 is a graph explaining a relationship between the substitution ratio and the standard deviation in an annealing method according to the present invention.

FIG. 25 shows an ordinary heat cycle of the spheroidizing annealing steps of a bearing steel (SUJ2). The present inventors have extensively studied regarding the method of stably performing a complete recarburization treatment by controlling only the carburizing gas atmosphere in the annealing without changing the heat cycle (heating temperature, heating time and temperature-descending rate) of the spheroidizing annealing. As a result, it has been found out that some measurements are required to deal with the following problems.

(1) Since an extremely varied decarburization is formed on the surface of the forged product and also strong oxide scales are also formed on the surface of the forged product, a sufficiently high carburizing atmosphere is required for the recarburization.

(2) According to an ordinary carburizing treatment, treating products are arranged so as to prevent the treating products from being superimposed. Whereas, in the annealing treatment, the treatment is performed while rendering the treating products to be piled up in large quantities, or to be superimposed or bundled. Therefore, even if the atmosphere is constituted by a carburizing gas, the carburizing gas cannot be diffused into the contacted portions of the treating products, thus making it difficult to perform a uniform recarburization in some cases.

(3) Since the annealing temperature is low as compared with the temperature employed in the ordinary carburizing treatment, if the concentration of the carburizing atmosphere is too high, soot is more likely to be generated, thus making it difficult to control the carburization and to perform the maintenance of the furnace.

(4) Since the annealing step involves a temperature-descending processing (step "b" of FIG. 25) and hence, the texture of the treating products is transformed in the temperature-descending processing, thus giving a great influence to the hardness and workability after the annealing step, the descending rate of temperature would become an important factor in the annealing step. However, the controlling of carburizing atmosphere in the temperature-descending processing becomes extremely difficult, and therefore, a complete controlling of carburizing atmosphere under the condition where the temperature changes gradually in the continuous furnace would be impossible as a matter of fact.

In a third embodiment of this invention, the aforementioned problems are taken into consideration. Therefore, this third embodiment is intended to provide a continuous annealing furnace which is capable of performing a continuous and massive spheroidization of bearing steel of high carbon and is also capable of stably and cheaply performing a recarburization of decarburized layer generated in the hot forging. A fourth embodiment of this invention is intended to provide an annealing method which is capable of obtaining the aforementioned effects by making use of the aforementioned continuous annealing furnace.

Next, the reasons for the limitations defined by this invention will be explained in detail.

(To Perform an Annealing in a Carburizing Atmosphere Such as an RX Gas)

In order to eliminate or to greatly reduce the finishing work of the pre-processing, it is necessary not only to perform an annealing using a carburizing atmosphere thereby to prevent the decarburization in the annealing step but also to recarburize the decarburization of the raw material as well as the decarburization generated at the occasion of hot forging.

It has been found out by the present inventors that, since the decarburization is effected through a reaction between oxygen of the atmosphere of the annealing furnace and carbon as apparent from the aforementioned experiment, the quantity of residual oxygen in the atmosphere of the annealing furnace is required to be controlled to $3 \times 10^{-18}$ atm or less so as to prevent the decarburization. Therefore, the furnace is required to be controlled using a direct inlet type oxygen sensor (CP-D) (available from NGK). Further, in order to carry out sufficiently the recarburization, the content of CO in the furnace which is required for the carburization is required to be controlled. Namely, it has been found as a result of experiments that the partial pressure of CO in the furnace is required to be 10% or more. However, in order to smoothly carry out the recarburization, the partial pressure of CO is required to be 16% or more. However, if the partial pressure of CO in the furnace is excessive, it may lead to a cause for the generation of soot, and hence, the partial pressure of CO should preferably be limited to 30% or less.

Further, the concentration of carburization which is suited for controlling the magnitude of recarburization and the generation of soot should be selected such that, in view of a phenomenon of redox, the generation of the partial pressure ratio (K) between CO and $CO_2$ should be suitably controlled. It is preferable in view of the results of above experiments to control the value of K to the range of $0.8 \leq K \leq 7$ at the general annealing temperature (750 to 820° C.). This partial pressure ratio (K) can be calculated by the following equation.

$$K = (CO \text{ partial pressure})^2 \text{ in furnace}/CO_2 \text{ in furnace}$$

(The Continuous Process in the Continuous Annealing Furnace is Partitioned Into Two or More Chambers)

As seen from the results of the above experiment, the controlling of the carburizing atmosphere in the annealing step is difficult. In particular, while a sufficient recarburizing capacity is required in the fore-stage of the annealing, the effect of temperature as well as the control of the generation of soot are required in the post-stage of the annealing.

Under the circumstances, the present inventors have succeeded to stabilize the control of atmosphere in the annealing step by partitioning the continuous furnace and controlling the atmosphere required for the conditions of treatment in each partitioned atmosphere. By increasing the number of partitioning, the atmosphere can be more precisely controlled. However, in view of the equipment of the continuous furnace, it is preferable to partition the continuous furnace into two or three.

(The Atmospheres of the Partitioned Treatment Chambers Differ From Each Other)

As described above, by partitioning the continuous furnace and then, by differentiating the atmosphere of each chamber from the others, the carburizing atmosphere can be controlled in the annealing step. The continuous furnace having the same structure can be often seen in the carburizing furnace which is designed to perform a high temperature treatment. However, in such a furnace, the atmospheres of neighboring treatment chambers are located relatively close to each other, and further, these treatment chambers are partitioned usually using a single door. Therefore, the atmospheres of neighboring treatment chambers are likely to be mixed with each other at the occasion of opening or closing the door, the influence thereof may be not serious.

Figure 24A:
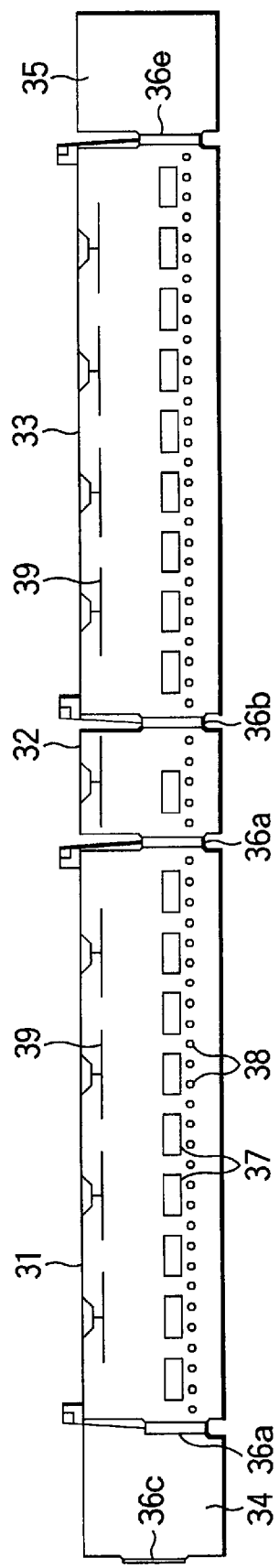
FIGS. 24A and 24B respectively show a schematic view of an annealing furnace according to the present invention.

On the other hand, according to the continuous annealing furnace of this invention, since a precise control of annealing temperature is required, once the atmospheres of neighboring treatment chambers partitioned into two or more are caused to be mixed with each other, it becomes difficult to precisely control the atmospheres. Therefore, in the case of the annealing furnace of this invention, the neighboring chambers are partitioned by a double door as shown in FIG. 24A, thus preventing the atmospheres of neighboring treatment chambers from being mixed with each other and also making it possible to perform a precise control.

Next, the reason for the limitations in the annealing method employing the aforementioned continuous annealing furnace will be explained in detail.

(Substitution Rate; Twice/hour or More)

As seen from the results of the above experiment, an extremely varied decarburization is formed on the surface of the forged product and also strong oxide scales are also formed on the surface of the forged product. Further, according to an ordinary carburizing treatment, treating products are arranged so as to prevent the treating products from being superimposed. Whereas, in the annealing treatment, the treatment is performed while rendering the treating products to be piled up in large quantities, or to be superimposed or bundled. Therefore, even if the atmosphere is constituted by a carburizing gas, the carburizing gas cannot be diffused into the contacted portions of the treating products, thus making it difficult to perform a uniform recarburization in some cases.

Figure 27:
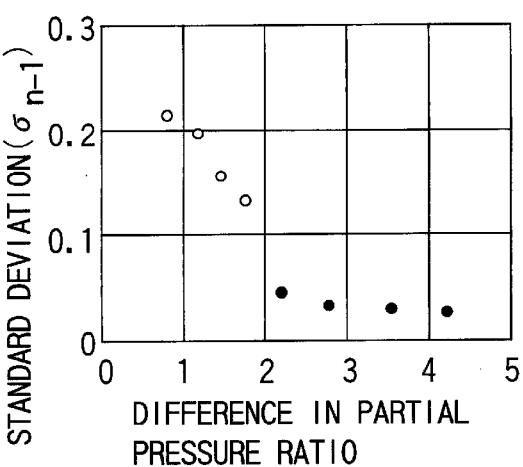
FIG. 27 is a graph explaining a relationship between a difference in the ratio of partial pressure and the standard deviation in an annealing method according to the present invention.

Therefore, it has been determined by the present inventors that it is impossible to control the atmosphere of the furnace by simply increasing or decreasing the concentration of recarburization or carburization, and hence, the flow rate of carburizing gas has been taken noticed of. FIG. 27 shows the non-uniformity of the substitution rate and of the recarburization. Even if the atmosphere is precisely controlled, if the substitution rate is less than two times, non-uniformity of the product will be generated. On the other hand, if the substitution rate is increased, the pressure inside the furnace becomes also higher, thus making it possible to minimize the change of atmosphere that may be caused by the external factors and to facilitate a precise control of the atmosphere.

Therefore, the pressure inside the furnace should preferably be set to 1 mm/$H_2O$ or more. However, if the flow rate of the gas atmosphere is unlimitedly increased, it simply invites an increase of the running cost of the annealing furnace. Therefore, in view of the experience in the carburization treatment, the substitution rate should preferably be limited to 5 times or less.

(The Treatment Atmosphere is Switched From a Carburizing Atmosphere to a Decarburizing Atmosphere)

As described above, an extremely varied decarburization is formed on the surface of the forged product and also strong oxide scales are also formed on the surface of the forged product. Further, different from the carburization treatment, the annealing is performed while rendering the treating products to be piled up in large quantities, or to be superimposed or bundled. Therefore, the carburizing gas may not be diffused into the contacted portions of the treating products. Therefore, the recarburization treatment is required to be performed using a high (high in carbon potential) carburizing atmosphere ensuring a sufficient substitution rate. Additionally, since the carburizing atmosphere may be deteriorated due to external factors, a gas atmosphere excellent in carburizing property is required to be employed.

However, at the middle stage of the continuous furnace, the atmosphere may be stabilized, so that if a high carburizing atmosphere is employed, soot may be more likely to be generated, thus requiring an adjustment of atmosphere. Further, at the stage of descending temperature, the soot is more likely to be generated, so that the atmosphere is required to be lowered (the carbon potential is required to be lowered).

Further, the uppermost surface portion that has been carburized in the fore-stage of annealing tends to be over-carburized. Therefore, the atmosphere is required to be lowered (the carbon potential is required to be lowered) so as to diffuse the carbon that has been increased in concentration.

Namely, when the carburizing atmosphere is enhanced at the fore-stage while lowering the carburizing atmosphere at the post-stage, the non-uniformity of recarburization can be minimized. FIG. 27 shows a difference in concentration of carburization between the fore-stage and the post-stage, and non-uniformity of recarburization.

It is possible to inhibit the non-uniformity of recarburization by setting a difference between the fore-stage and the post-stage to a value of 2 or more with the value of K being kept in the range of $0.8 \leq K \leq 7$. Therefore, it is preferable to control the difference in carburization concentration between the fore-stage and the post-stage to the range of $0.8 \leq K \leq 7$ as it is expressed by a difference in partial pressure ratio K (750 to 820° C.) and at the same time, to control this difference to the range of (the partial pressure ratio of the fore-stage treatment chamber $K_1$–the partial pressure ratio of the post-stage treatment chamber $K_2$)$\geq -2$.

Next, the reason for the limitations on the bearing that has been recarburized in the aforementioned continuous annealing furnace will be explained.

(The Finished Raceway Surface of Bearing Exhibits a Maximum Carburization Ratio of 5% to 30% and a Carburization Depth of 0.1 mm to 0.5 mm)

When the state of damage in the bearings that have been generally employed in the industries was investigated, it was found that most of them were suffered from a surface damage type fatigue. Namely, the ball bearings which have been considered as being employed in a clean lubricated condition are actually employed under a condition which is contaminated by the penetration of dusts and foreign matters or which is poorly wet with a lubricant, thereby causing a fatigue of the uppermost surface of the raceway. In particular, when the bearing is employed under severe conditions where the life of bearing is considered as being important, the damage from the surface of bearing can be often admitted.

The present inventors have already reported on the surface fatigue of bearing that the higher the residual austenite or the higher the hardness of the bearing is, the longer the life thereof is. When a test on the life of finished bearing that had been subjected to a recarburizing annealing in the pre-processing was conducted, a tendency to prolong the life thereof was recognized in the bearings where a recarburizing annealing was left remained therein.

Figure 28:
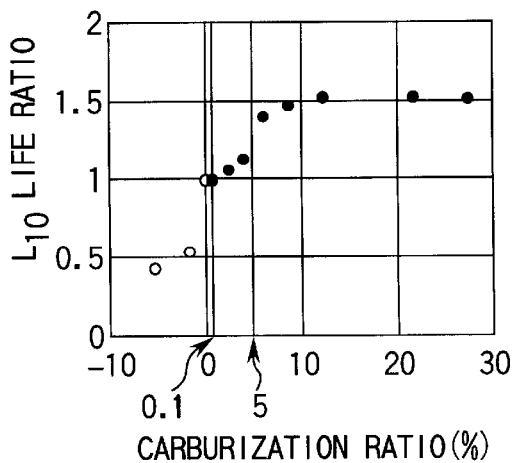
FIG. 28 is a graph explaining a relationship between the ratio of carburization and the ratio of life in an annealing method according to the present invention.
Figure 29:
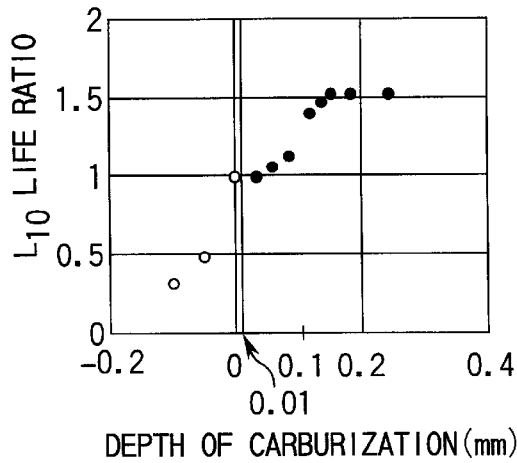
FIG. 29 is a graph explaining a relationship between the depth of carburization and the ratio of life in an annealing method according to the present invention.

FIGS. 28 and 29 show the results obtained from a test using a lubricating oil contaminated with foreign matters that may become a cause for a surface-originating type damage of a bearing.

As seen from FIG. 28, when the carburization ratio was 0.1% or more, the life of the bearing became more than comparable to that of the conventional bearing. It will be seen that carburization ratio should preferably be 5% or more in order to ensure the effect of prolonging the life of bearing. However, when the carburization ratio was more than 30%, the finishing workability of the fore-stage processing was deteriorated. Therefore, the carburization ratio should preferably be confined to the range of 5% to 30%. Further, as seen from FIG. 29, when the carburization depth was 0.01 mm or more, the life of the bearing became more than comparable to that of the conventional bearing. It will be seen that carburization depth should preferably be 0.1 mm or more in order to ensure the effect of prolonging the life of bearing. However, when the carburization depth was more than 0.5 mm, the finishing workability of the fore-stage processing was deteriorated. Therefore, the carburization depth should preferably be confined to the range of 0.1 mm to 0.5 mm.

In this invention, basic experiments were performed using SUJ2 as a raw material. However, as far as a desired quality as a bearing can be obtained through a hardening and a tempering, other kinds of bearing steel of high carbon can be employed. The mixing ratio of components (such as C, Si, Mn, Cr) may be the same as explained with reference to the first embodiment of this invention.

3. Continuous Annealing Furnace and Annealing Method

The present inventors have conducted various experiments for achieving the aforementioned objects. As a result, it has been found that the spheroidizing annealing should be performed by partitioning the annealing atmosphere into two, wherein a carburizing gas atmosphere should be employed at a high temperature zone where the carburization (recarburization) was to be effected, while a non-oxidizing gas atmosphere or a decarburizing gas atmosphere should be employed at an annealing (low temperature) zone where the spheroidizing annealing was to be effected. I has been also found that when these two atmospheres are completely partitioned, the decarburization layer can be eliminated and the generation of oxide scale can be avoided.

The conditions for each atmosphere are as follows. Namely, in the zone of carburizing atmosphere where a raw material is treated at a temperature of 780 to 810° C., the contents of CO and $CO_2$ in the atmosphere should be such that the ratio of $P(CO)^2/PCO_2$ falls within the range of 4.5 to 7.0, while in the zone of spheroidizing atmosphere (non-decarburizing atmosphere) where a raw material is treated at a temperature of 740 to 700° C., the contents of CO and $CO_2$ in the atmosphere should be such that the ratio of $P(CO)^2/PCO_2$ falls within the range of 0.8 to 2.3.

The relational expression of atmosphere-controlling value $\{P(CO)^2/PCO_2\}$ of both zones can be preferably controlled on the basis of value represented by the following formula (3).

$$\text{Value ``}B\text{''} = (8/\text{value ``}A\text{''}) \pm 0.5 \quad (3)$$

wherein the value "A" denotes the value of $P(CO)^2/PCO_2$ in the carburizing zone (in the first treatment chamber), while the value "B" denotes the value of $P(CO)^2/PCO_2$ in the spheroidizing annealing zone (in the second treatment chamber).

Next, the reason for the limitations on the type of furnace, on the composition of atmosphere, on a method of separating the gas atmosphere and on the method of controlling the atmosphere in the continuous annealing furnace will be explained.

(The Reason for Selecting a Continuous Annealing Furnace as a Type of Furnace)

When a batch type furnace is employed, a treating article (an article to be treated) is required to be taken out of the furnace once and then, reheated for the purpose of subjecting it to the separated atmospheres for carrying out two different treatment, i.e. in the carburizing zone and in the spheroidizing annealing zone. Therefore, the productivity thereof would greatly restricted. By contrast, since a continuous furnace is employed in this invention, a large number of articles can be treated concurrently, thus improving the productivity thereof.

In this separation of atmosphere, an intermediate chamber is placed at the position where the carburizing zone is terminated, and the front and rear ends of each chamber are partitioned using a door. As a result, the carburizing gas atmosphere and the spheroidizing annealing gas atmosphere can be individually substituted or shut off, thus making it possible to completely partition these atmospheres. Due to this complete partitioning of these atmospheres, it has become possible to solve the problem of precipitating soot which is most prominently generated in the annealing zone of the spheroidizing annealing zone in contrast to the conventional method wherein the annealing has been conducted using an endothermic carburizing gas such as an RX gas.

Namely, according to the conventional method, at the occasion of annealing after the accomplishment of soaking, CO gas in the carburizing gas composition is caused to decompose into C and CO, the resultant C being more likely to be turned into soot, thus raising a problem of sooting. Whereas, according to this invention, the CO gas composition which is a main cause for generating soot and is contained in the atmosphere of the annealing zone (in which the generation of soot is most prominent) is minimized and replaced by a mixed gas comprising a carburizing gas such as an RX gas and a decarburizing modified gas such as an NX gas, and at the same time, the gas atmosphere is controlled in terms of the value of $P(CO)^2/PCO_2$ to be obtained from CO and $CO_2$ in the mixed gas. As a result, it is now possible to manufacture, from a bearing ring exhibiting a decarburized surface before the treatment of this invention, a bearing ring having a suitable surface exhibiting an optional carbon concentration which is desirable for the manufacturing process as well as for the function of bearing.

(The Reason for Defining That, in the Zone of Carburizing Atmosphere Where a Raw Material is Treated at a Temperature of 780 to 810° C., the Contents of CO and $CO_2$ in the Atmosphere are Controlled Such That the Ratio of $P(CO)^2/PCO_2$ Falls Within the Range of 4.5 to 7.0)

The carburization of an ordinary steel is generally performed at the γ zone which is equivalent to a temperature of 850 to 1,000° C. Generally, the carburization takes place through the generation of a carbide and through a diffusion at the γ zone of solid-solubilized carbon, so that the higher the treating temperature is, the greater the diffusion thereof proceed, thus resulting in an increase in depth of carburization. Therefore, once a decarburization has been taken place in a steel, the steel is required to be subjected to carburization at a temperature which is higher than that conventionally employed, and then, to reheating so as to perform the spheroidizing annealing.

However, it has been found that even if the carburization has been performed at a temperature of 780 to 810° C. which is a soaking temperature suitable for a spheroidizing annealing, if the contents of CO and $CO_2$ in the atmosphere are controlled such that the ratio of $P(CO)^2/PCO_2$ falls within the range of 4.5 to 7.0, it is possible to suppress the generation of bulky carbide which has been considered as being more likely to be generated at the grain boundary when the carburization is performed at low temperatures.

If the value of $P(CO)^2/PCO_2$ is less than 4.5, the effect to recarburize the decarburized ring would not become sufficient enough, thus leaving a residual decarburized layer. On the other hand, if the value of $P(CO)^2/PCO_2$ is more than 7.0, the concentration of carbon on the surface would increase excessively, thus allowing a bulky carbide to precipitate excessively and hence, giving a bad influence to the workability in the subsequent steps. Furthermore, an excessive quantity of carbon which failed to part in the reaction would be precipitated, thus allowing sooting to generate in the furnace.

(The Reason for Defining That, in the Zone of Spheroidizing Atmosphere (Non-decarburizing Atmosphere) where a raw material is treated at a temperature of 740 to 700° C., the contents of CO and $CO_2$ in the atmosphere should be such that the ratio of $P(CO)^2/PCO_2$ falls within the range of 0.8 to 2.3).

When the spheroidizing annealing is to be performed at the aforementioned temperature zone by making use of only the conventional carburizing atmosphere (RX gas), since the content of CO in the RX gas is as high as 20%, the lower the temperature is, the more increasingly CO tends to be decomposed into C and $CO_2$. As a result, C is precipitated as soot, thus setting forth a problem. Therefore, according to this invention, a decarburizing gas such as NX gas is mixed with the conventional RX gas thereby overcoming this problem.

If the value of $P(CO)^2/PCO_2$ that can be determined by the contents of CO and $CO_2$ in the gas atmosphere is less than 0.8, the decarburizing property becomes excessive, so that the carbon that has been incorporated into the surface region in the carburization zone would be decarburized again. As a result, it may become difficult to sufficiently recarburize the decarburized layer that has been formed through thermal history. Further, if the value of $P(CO)^2/PCO_2$ is more than 2.3, the carburizing property becomes excessive, thus generating the same problem as in the case of the aforementioned carburizing zone. (The reason that the relational expression of atmosphere-controlling value $\{P(CO)^2/PCO_2\}$ of both zones can be preferably controlled on the basis of value represented by the following formula (4))

$$\text{Value ``}B\text{''} = (8/\text{value ``}A\text{''}) \pm 0.5 \quad (4)$$

wherein the value "A" denotes the value of $P(CO)^2/PCO_2$ in the carburizing zone, while the value "B" denotes the value of $P(CO)^2/PCO_2$ in the spheroidizing annealing zone.

As a result of further studies, it has been found that by providing the atmosphere control values of the carburizing zone and annealing zone with the relationship represented by above formula (4), (the concentration of carbon on the surface layer of a work piece) can be homogeneously controlled to a value of $\pm 0.05\% C_0$ at the moment of finishing the annealing ($C_0$: an average C % of the base material).

This means that it is possible to eliminate a difference in concentration of carbon in relative to the base material, if the atmosphere of carburizing zone is controlled based on the value of "A", and then, the following spheroidizing annealing zone is controlled based on the controlling width of value of "B" which can be derived from the above formula (4).

As a result of extensive studies on the relationship in atmosphere between the carburizing zone and the spheroidizing annealing zone, the following relationship has been found out. Namely, when the carburizing treatment was performed while keeping an atmosphere of high concentration of carbon ($P(CO)^2/PCO_2$ ("A" value) is high) at the carburizing zone, and then, the spheroidizing annealing was performed while keeping an atmosphere of carburizing nature ($P(CO)^2/PCO_2$ ("A" value) is high) at the spheroidizing annealing zone, the concentration of carbon of the surface layer would become relatively high at the moment of accomplishing the annealing.

On the contrary, if the carburizing treatment was performed while keeping an atmosphere of low concentration of carbon at the carburizing zone, and then, the spheroidizing annealing was performed while keeping an atmosphere of decarburizing nature at the spheroidizing annealing zone, the concentration of carbon of the surface layer would become relatively low at the moment of accomplishing the annealing. Therefore, it has been found that if the treatment is desired to be performed in such a way that the concentration of carbon on the surface layer of a work piece can be homogeneously controlled to a value of $\pm 0.05\%C_0$ at the moment of finishing the annealing, the atmospheres of both zones should be controlled such that the relationship of atmospheres of both zones {a value of $P(CO)^2/PCO_2$} meets the value represented by the above formula (4).

Further, the controlling of atmosphere of the carburizing zone may be performed by controlling the value of $P(CO)^2/PCO_2$ to be derived from the analysis of CO and $CO_2$, or by making use of an oxygen sensor which is capable of measuring the residual oxygen of the atmosphere of the furnace and of controlling the carburizing atmosphere. The controlling value in this case may be substituted by value of the oxygen sensor on the basis of the limitation represented by the value of $P(CO)^2/PCO_2$ (1085 to 1110 mV according to FIG. 12).

BEST MODE OF CARRYING OUT THE INVENTION

EXAMPLES 1 TO 3

Figure 2:
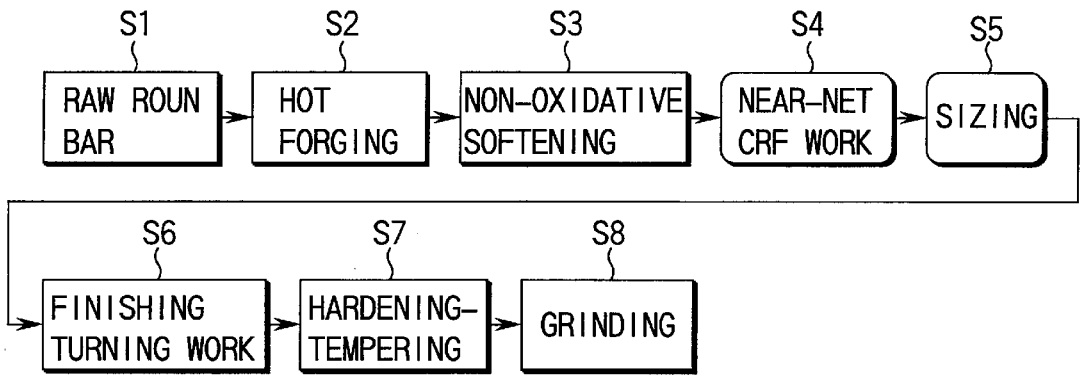
FIG. 2 shows a block diagram explaining, in sequence of steps, the method of manufacturing an inner ring and an outer ring of a deep groove ball bearing according to the present invention.
Figure 3:
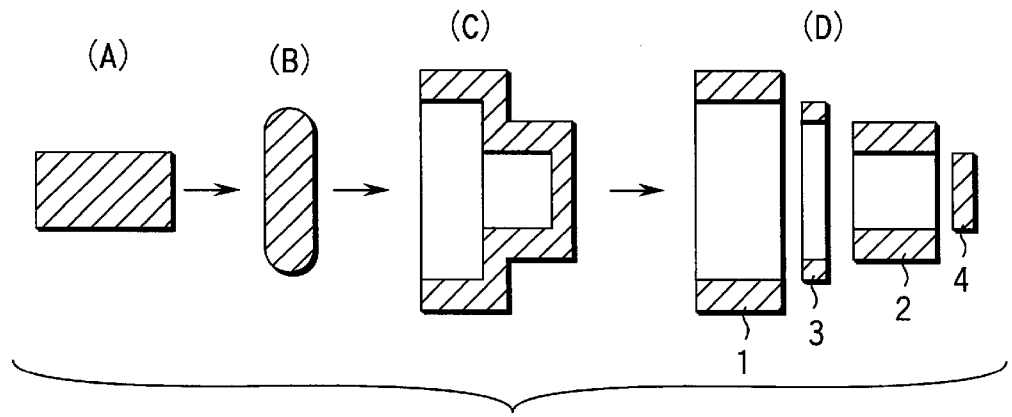
FIG. 3 shows a cross-sectional view explaining sequentially the steps after the hot forging step in conformity with the steps shown in FIG. 1 of the prior art.

Next, Examples 1 to 3 of this invention will be explained. FIG. 2 shows the method of manufacturing an inner ring and an outer ring of a deep groove steel ball bearing according to the present invention wherein a grinding work is performed after a heat treatment. As compared with the conventional manufacturing method wherein the CRF working shown in FIG. 1 is incorporated, the method of this invention is featured in that it comprises the annealing step (S3), the CRF working step (S4) and the turning step (S8). Namely, this invention provides a method of manufacturing a bearing which is capable of minimizing the manufacturing cost through a combination of optimum working steps.

First of all, each step according to this invention will be briefly explained. As a raw round bar, a round steel bar which is generally being rolled was employed as it was (S1). Then, a hot forging is performed generally using a multi-stage former thereby to produce a rough ring to be subsequently finished into an inner ring or an outer ring (S2). After this hot forging, a softening for spheroidizing the carbide for the convenience of a cold working or a turning work was performed under a non-oxidizing condition (S3). Then, the CRF working was performed according to the near net system (S4), which was followed by a sizing work (S5). Further, after a finishing turning work was finished (S6), the ring was subjected to a quenching and an annealing thereby to obtain a suitable hardness of the ring required for the bearing (S7). Next, the raceway surface and the fitting surface of the ring was subjected to a grinding work thereby to manufacture an inner ring and an outer ring (S8).

In Examples 1 to 3 of this invention, the material employed was SUJ2, and the bearing to be manufactured was a deep groove ball bearing 6304. Next, each manufacturing step will be explained in detail.

Figure 17:
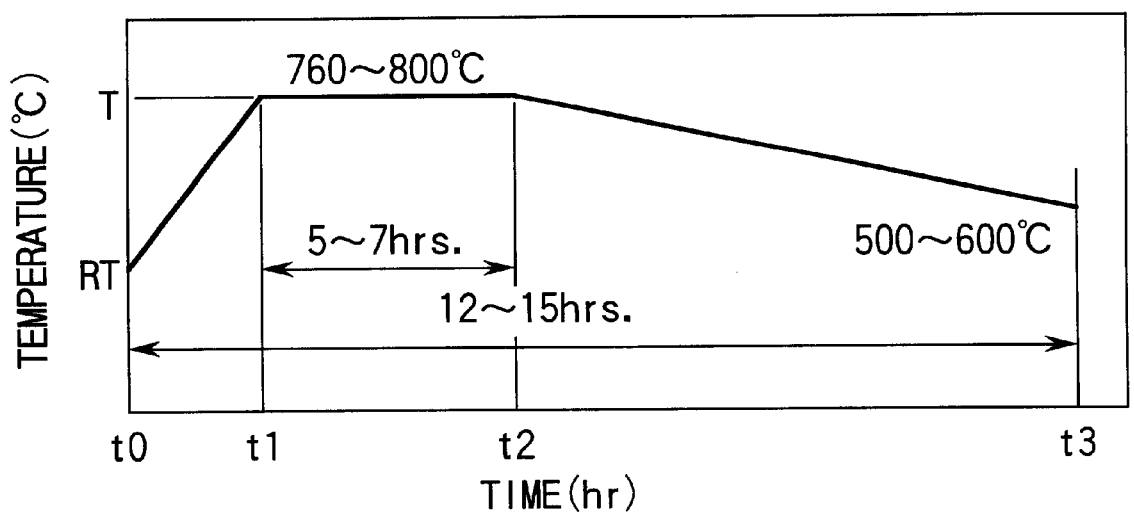
FIG. 17 is a graph explaining an annealing step according to the present invention.

FIG. 17 illustrates the annealing step according to this invention. A very little amount of propane was added to a nitrogen atmosphere thereby controlling the quantity of residual oxygen in the furnace. The measurement of residual oxygen quantity in the furnace was performed using a direct inlet type oxygen sensor (CP-D) (available from NGK). FIG. 13 shows a relationship between the value of an oxygen sensor (mmV) and the surface decarburization ratio D (%) under various annealing conditions.

When the value of the oxygen sensor becomes 900 mmV or more, the magnitude of decarburization decreases, and when the value of the oxygen sensor becomes more than 1,000 mmV, the decarburization would not be recognized in the annealing step. On the other hand, FIG. 12 shows a relationship between the value of an oxygen sensor and the partial pressure (atm) of oxygen in the furnace as shown in the aforementioned equation (1). Therefore, the quantity of oxygen remaining in the furnace should be controlled to $3 \times 10^{-18}$ atm or less. Further, in order to ensure a sufficient alleviation of decarburization, the quantity of oxygen remaining in the furnace should be controlled to $3 \times 10^{-20}$ atm or less.

In Examples 1 to 3, the value of oxygen sensor was set to a predetermined value, and the quantity of propane gas to be incorporated was controlled.

Annealing conditions A1: 1 to 2% of propane gas was added to the nitrogen gas atmosphere, and the value of oxygen sensor was controlled to 900 to 990 mmV.

Annealing conditions A2: 1 to 2% of propane gas was added to the nitrogen gas atmosphere, and the value of oxygen sensor was controlled to 1,000 to 1,050 mmV.

Annealing conditions A3: 0.5 to 1.5% of propane gas was added to the nitrogen gas atmosphere, and the value of oxygen sensor was controlled to 1,060 to 1,100 mmV.

Annealing conditions A4: The annealing was performed using only the nitrogen gas atmosphere.

The annealing conditions A1, A2 and A3 belong to this invention.

Then, the conditions for the CRF working will be explained. The working machine employed was CRF70 (tradename, Kyoei Seiko Industries), the working load was 5 to 7 tons, the lubricant employed was a press former (PZ13: tradename, Sanko Kagaku Co., Ltd.), and the enlargement ratio of diameter by means of the CRF was 1.4 to 2.0 times in the case of the outer ring, and 1.1 to 1.4 times in the case of the inner ring.

Since the decarburization does not substantially take place after the annealing in this invention, the magnitude of turning after the CRF can be minimized. Therefore, the configurations of the inner and outer rings can be formed into a configuration which is very close to that of a finished product. However, if these configurations are to be finished too precisely, the time for the CRF working may be excessively prolonged. Accordingly, in this invention, the CRF working is performed by means of a near-net system where the shape thereof is formed into an approximate shape which is then optimized in the following finishing turning work.

Examples 1 to 3 was performed by changing the method of working.

CRF conditions B1: A working speed of 650 to 750 pieces/hour using a near-net working.

CRF conditions B2: A working speed of 650 to 750 pieces/hour using only a rolling work.

CRF conditions B3: A working speed of 300 to 400 pieces/hour using a high precision work.

This "high precision work" herein indicates the works for forming a sealing groove, a raceway groove and chamfer (the width is optional), and the CRF work for forming the ring into a configuration which is close to the finished configuration. In this case, the CRF work takes four times as long period as that of the CRF conditions B1. Further, since an adjustment of dimension (working) is performed in order to precisely determine the magnitude of the CRF prior to the CRF conditions B3, the decarburization layer can be also removed, thus being preferable in view of the decarburization. However, it invites an increase in manufacturing cost.

The CRF conditions which belongs to this invention is B1.

The conditions for the turning work were as follows. Namely, a high speed turning machine was employed as a working machine, the tool employed was P10, the cutting speed was 200 to 250 m/minute, and the feed per revolution was 0.2 to 0.3 mm/revolution. When the CRF ring is to be subjected to an over-all turning in general, 8 to 10 steps are required in total for the treatment of both inner ring and outer ring. Further, since the turning work is required to be performed while chucking the ring, it is impossible, in this over-all turning, to simultaneously perform the turning of all of the external configuration and the inner circumferential surface of the ring. Namely, the ring is required to be re-chucked several times in the turning work.

Since the turning work of the inner circumferential surface of the inner ring and of the outer circumferential surface of the outer ring can be eliminated according to the method of this invention, it is possible to reduce the number of re-chucking of the ring. Furthermore, since the magnitude of cutting can be reduced, the time required for turning the raceway surface can be also minimized.

Examples 1 to 3 was performed by changing the method of working.

Turning conditions C1: By eliminating the turning work of the inner circumferential surface of the inner ring and of the outer circumferential surface of the outer ring, the number of re-chucking of the ring is reduced.

Turning conditions C2: To perform an over-all turning including the turning of the inner circumferential surface of the inner ring and of the outer circumferential surface of the outer ring.

The turning conditions which belongs to this invention is C1.

The results obtained in the working of the bearings through various combination of working methods are shown in the following Table 1. The material employed was SUJ2, and 2,000 pieces of the deep groove ball bearing 6304 were prepared in each method. After performing the hardening, tempering and grinding works, the quality and manufacturing cost of the finished bearings were investigated for the evaluation thereof.

The determination of the quality of the finished bearings was performed by measuring the quantity of carbon in the surface layer of the finished bearings. In this case, when the quantity of carbon is 1% or more against the quantity of carbon of SUJ2 raw material which is 1% and when the carbon content of the inner circumferential surface of the inner ring and of the outer circumferential surface of the outer ring, even though these portions are not subject to a rolling contact fatigue, is 0.95% or more, the bearing was determined as being "good", whereas, when the carbon content of the inner circumferential surface of the inner ring and of the outer circumferential surface of the outer ring is 1% or more, i.e. if no decarburization is admitted at all even in the outer circumferential surface of the outer ring which usually exhibits a largest magnitude of decarburization, the bearing was determined as being "excellent".

When the manufacturing cost of the bearing was found lower than that of the manufacturing method incorporating the CRF working shown in FIG. 1 which enables the magnitude of turning to be reduced thereby to improve the yield of material, and which is conventionally considered as being lowest in manufacturing cost, the method was determined as being "low", whereas when the manufacturing cost of the bearing was found equivalent to or higher than that of the aforementioned conventional manufacturing method, the method was determined as being "high". Further, when the manufacturing cost of the bearing was found almost the same or somewhat improved or potentially improvable as compared with that of the aforementioned conventional manufacturing method, the method was determined as being "ordinary".

TABLE 1

|  |  | Softening | CRF word | Turning | Residual decarbirization | Cost |
|---|---|---|---|---|---|---|
| Example | 1 | A1 | B1 | C1 | Good | Low |
|  | 2 | A2 | B1 | C1 | Excellent | Low |
|  | 3 | A3 | B1 | C1 | Excellent | Low |
| Comparative Example | 1 | A4 | B1 | C1 | Bad | Low |
|  | 2 | A1 | B2 | C1 | Good | Normal |
|  | 3 | A1 | B3 | C1 | Good | High |
|  | 4 | A1 | B1 | C2 | Good | High |

Since Examples 1 to 3 set forth minimum conditions which enables the decarburization to be prevented in the annealing conditions, no problem is seemed to be raised regarding the capabilities of the bearing. In some instance however, the carbon content of slightly less than 1% was admitted in the outer circumferential surface of the outer ring which usually exhibits a largest magnitude of decarburization. On the other hand, in the case of Comparative Example 1 where the quality of residual oxygen was relatively large in the conditions of annealing, the decarburization was caused to remain in the finished product. Further, in the case of Comparative Example 2 wherein the CRF working consisting only of rolling was performed, even if the number of re-chucking was reduced in the turning step, the magnitude of turning was increase, thus slightly deteriorating the yield of material and the turning rate. Therefore, when Comparative Example 2 is totally evaluated including the control of atmosphere in the annealing and the equipment investment, the manufacturing cost involved therein was found almost the same or somewhat improved or potentially improvable as compared with the aforementioned conventional manufacturing method.

On the other hand, in the case of Comparative Example 3 wherein the high precision CRF working was performed, due to an increase in cost for the CRF, the total cost was almost the same or somewhat higher as compared with the aforementioned conventional manufacturing method. In the case of Comparative Example 4 wherein over-all turning was performed, the total cost was naturally somewhat higher as compared with the aforementioned conventional manufacturing method.

According to the method of this invention for manufacturing an inner ring and an outer ring of a deep groove steel ball bearing wherein a grinding work is performed after a heat treatment, since the decarburization in the annealing step can be minimized and the sizing is performed subsequent to the near-net CRF, it is possible to dispense with the turning work of the inner circumferential surface of the inner ring and of the outer circumferential surface of the outer ring. Additionally, it is possible to greatly reduce the magnitude of the turning work of the raceway surface and of the sealing groove.

Next, the verification method in the employment of the manufacturing method of this invention will be explained.

Figure 18A:
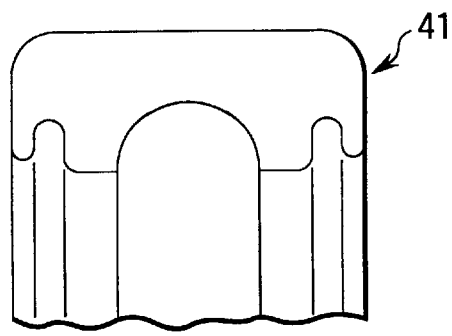
FIGS. 18A and 18B respectively show a cross-sectional view explaining a finished outer ring according to the present invention.
Figure 18B:
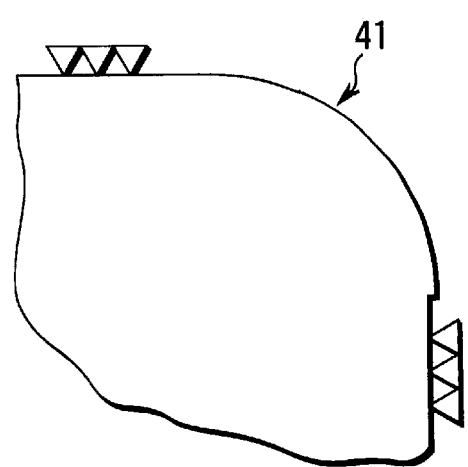
Figure 19A:
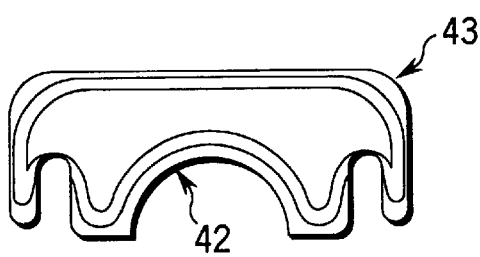
FIGS. 19A and 19B respectively show a cross-sectional view explaining a forging step when a near net CRF was performed according to the prior art.
Figure 19B:
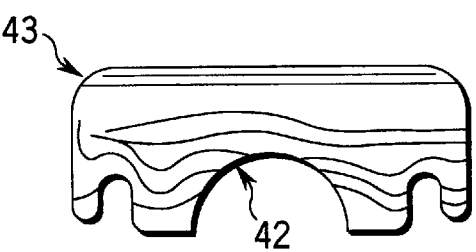

FIGS. 18A and 18B respectively shows a cross-sectional view explaining a finished outer ring according to the present invention. Specifically, FIG. 18A shows a main portion of the finished outer ring, while FIG. 18B shows a partially enlarge view of FIG. 18A. When the outer ring is produced according to the method of this invention, the magnitude of decarburization is relatively prominent at the shoulder portion 41 thereof, but the magnitude of turning thereof becomes quite a little after the annealing and at the same time, the magnitude of grinding thereof after the heat treatment becomes quite a little or the grinding thereof can be dispensed with. Therefore, the results measured regarding the decarburization of the shoulder portion 41 of the finished outer ring would become almost the same as those shown in FIG. 15, or the surface concentration of carbon may become higher in some cases. Namely, the decarburization that has been generated at the occasion of hot forging would be remained as a trace, and at the same time, the trace of recarburization formed by the hardening would be also remained. On the other hand, according to the conventional method, since the ring is subjected to an over-all turning work after the annealing thereof, the decarburized layer is once removed, thus obtaining the same results as shown in FIG. 11. On the other hand, when the near-net CRF is performed, the forging flow will be formed conforming with the configuration of the raceway surface portion 42 or of the shoulder portion 43 as shown in FIG. 19A. Whereas, in the case of the ordinary CFR, as shown in FIG. 19B, the forging flow will be interrupted, due to the turning work, at the raceway surface portion 42 or at the shoulder portion 43.

Although the manufacturing method of a deep groove ball bearing has been explained in the foregoing description, this invention is also applicable to the manufacture of the outer and inner rings of other kinds of bearing such as a conical bearing and cylindrical bearing.

EXAMPLES 4 TO 15

Next, Examples 4 to 15 of this invention wherein not only the oxygen content in the furnace is reduced so as to prevent a decarburization but also the recarburization is also performed will be explained. FIG. 2 shows the method of manufacturing an inner ring and an outer ring of a deep groove steel ball bearing according to the present invention wherein a grinding work is performed after a heat treatment. As compared with the conventional manufacturing method wherein an over-all turning is performed after the CRF working as shown in FIG. 1, the method of these examples is featured in that, since the magnitude of cutting at the step of turning or grinding is minimized to a limit, a recarburization is performed in a recarburizing atmosphere at the occasion of annealing, the resultant recarburized layer being left remained in such a degree that would not deteriorate the productivity including the workability, thus achieving a prolonged life. Namely, it has been found that the effect of reducing the manufacturing cost through a reduction of cut-off as well as the effect of prolonged life can be simultaneously achieved by performing an optimum recarburizing annealing treatment.

It has been also found that a suitable magnitude of decarburized layer should preferably be left remained at the portion of the ring other than the raceway surface giving a direct influence to the rolling life, because the presence of the decarburized layer is effective in improving the workability and in lowering the manufacturing cost without giving a damage to the capabilities of the bearing.

In these Examples of this invention, the material employed was SUJ2, and the bearing manufactured and evaluated of its capabilities was a deep groove ball bearing 6304.

(The Workability and Life in Relative to the Carburization Ratio and Depth of the Raceway Surface of a Finished Product)

In the meantime, the present inventors have investigated as to the state of damage in the normal size ball bearings that have been generally employed in the industries, finding that most of them are suffered from a surface damage type fatigue. Namely, the ball bearings which are considered as being employed in a clean lubricated condition are employed under the conditions where the uppermost surface of the raceway is actually contaminated by the penetration of dusts and foreign matters. In particular, when the bearing is employed under severe conditions where the life of bearing is considered as being important, the damage of the surface of bearing can be often admitted. Therefore, in order to obtain a bearing of long life, the bearing is required to be resistive to the damage of surface-originating type.

Therefore, various kinds of test bearing were prepared by changing the carburizing ratio and depth of the raceway surface thereof, and were tested for evaluations including a CRF workability by using a lubricating oil mixed with a foreign matter which may cause a damage of surface-originating type to the bearing.

(a) The evaluation of the life of CRF tools:

In practice of the CRF working, the mandrel 22 shown in FIG. 5 tends to be easily damaged due to the abrasion thereof, which will be reflected as a consumable article on the working cost. The conditions for the evaluation of the life of this CRF tool were as follows.

Working machine: CRF70 (tradename, Kyoei Seiko Industries);

Working load: 5 to 7 tons;

Lubricant: Press former (PZ13: tradename, Sanko Kagaku Co., Ltd.);

Diametral enlargement ratio: Outer ring=1.4 to 2.0 times; and Inner ring=1.1 to 1.4 times;

Working speed: 550 to 750 pieces/hour.

The evaluation of the mandrel was performed as follows. Namely, the moment when the abrasion of the mandrel became 0.2 mm or more, and the moment when the shape of the groove (raceway groove) of the CRF ring 7 shown in FIG. 4E was deformed due to the wearing in the working of the outer ring were determined as the life. Table 2 shows the results obtained. Since the ring of Comparative Example No. 9 was subjected to an over-all turning according to the conventional method after the CRF working, neither the decarburization nor the carburization was formed on the raceway of the finished product. It will be seen from Table 2 that although Examples 4 to 8 of this invention were formed of products which had undergone a carburizing (recarburizing) treatment, but indicated the same degree of workability as that of Comparative Example No. 9 of the conventional product. However, Comparative Example No. 6 where the carburization ratio was more than 30% indicated a poor workability. Whereas, Comparative Example No. 8 where the carburization ratio was not more than 30% but the depth of carburization was over 0.5 mm was found as being poor in workability of CRF.

TABLE 2

|  | No. | Finished raceway surface | | Life of CRF tool (piece × $10^3$) | Foreign matters mixed $L_{10}$ life (Hr.) |
| --- | --- | --- | --- | --- | --- |
|  |  | Carburization ratio (%) | Carburization depth (mm) |  |  |
| Example | 4 | 6 | 0.12 | 18.1 | 23.2 Hr |
|  | 5 | 9 | 0.14 | 18.0 | 24.3 Hr |
|  | 6 | 12 | 0.15 | 17.6 | 25.1 Hr |
|  | 7 | 21 | 0.18 | 17.3 | 25.3 Hr |
|  | 8 | 28 | 0.24 | 17.2 | 25.1 Hr |
| Comparative Example | 5 | 3 | 0.05 | 18.3 | 16.9 Hr |
|  | 6 | 35 | 0.32 | 8.5 | 19.8 Hr |
|  | 7 | 6 | 0.07 | 18.2 | 19.5 Hr |
|  | 8 | 28 | 0.53 | 7.5 | 25.4 Hr |
|  | 9 | 0 | 0 | 18.3 | 16.5 Hr |

(b) The evaluation of life test (6206 Test) under the conditions where foreign matters were mixed into a lubrication oil.

By making use of the SUJ2 ball as a rolling element, the life time thereof until a flaking was generated was measured thereby to prepare a Weibull plot. From this Weibull distribution, $L_{10}$ life of each ball was determined. The conditions for this evaluation were as follows.

Pressure on the testing surface: Maximum 260 MPa;
Revolution speed: 3,000 rpm;
Lubricating oil: #68 turbine oil;
Mixed foreign matter: Composition: stainless-based powder; Hardness: HRC52; Particle diameter: 74–147 μm; Quantity: 500 ppm in the lubricating oil.

The results obtained are shown in FIG. 8 and in Table 2. When the carburization ratio was 5% or more, the examples of this invention indicated a longer life as compared with Comparative Example No. 9 of the conventional product. However, in the case of Comparative Example No. 5 where the carburization ratio was less than 5%, it was impossible to obtain an effect of prolonging the life due to an insufficiency of the carburization. Further, even if the carburization ratio was 5% or more, when the depth of carburization was less than 0.1 mm as exemplified in Comparative Example No. 7, it was impossible to obtain a sufficient residual compression stress, thus deteriorating the effect of prolonging the life.

By the way, the heat treatment conditions of the 6206 test bearing were as follows. The test bearing was kept at a temperature of 810 to 850° C. for 0.5 to 1 hour, after which the test bearing was subjected to a hardening and then to a tempering for 2 hours at a temperature of 160 to 200° C.

(The Conditions for a Heat Treatment for Performing the Recarburization at the Occasion of Annealing)

In the manufacturing method of this invention, the state of recarburization after the annealing is most important. As a result of the repetition of recarburizing annealing which were performed under various conditions, it has been confirmed that although it was possible to realize the recarburization under any carburization conditions, there is an optimum condition which satisfies all of productivity, manufacturing cost and the stability of quality. Namely, it has been confirmed that the following conditions "A" are most preferable in this invention.

Figure 21:
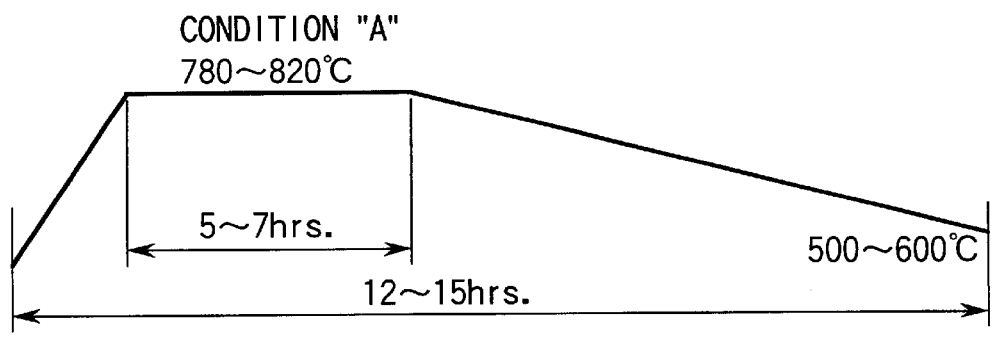
FIG. 21 is a graph explaining a relationship between the time and the temperature when a recarburizing annealing was performed under the conditions of "A"

Conditions "A": The recarburization is performed at 780 to 820° C., i.e. the same temperature as the temperature of annealing for 5 to 7 hours, with the atmosphere in the furnace being controlled by adjusting the CP value through a mixing of an RX gas and nitrogen gas, and subsequently, the temperature is gradually cooled down to 500 to 600° C. (see FIG. 21).

Figure 22:
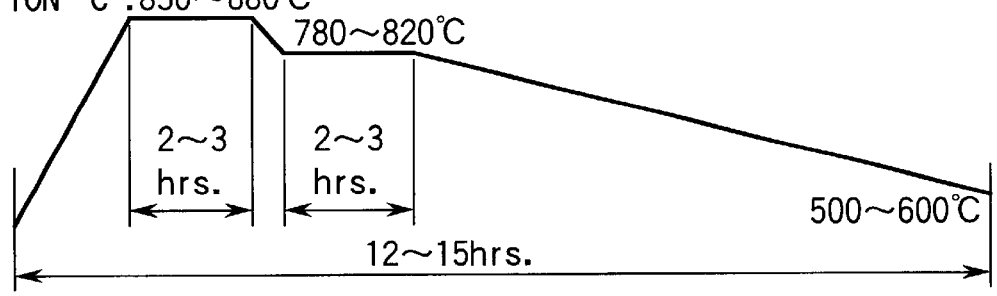
FIG. 22 is a graph explaining a relationship between the time and the temperature when a recarburizing annealing was performed under the conditions of "B" and "C"

Conditions "B": The carburization is performed at 900 to 950° C. for 2 to 3 hours, with the atmosphere in the furnace being controlled by mixing an RX gas and nitrogen gas, and subsequently, the temperature is cooled down to 780 to 820° C. which is maintained for 2 to 3 hours thereby to adjust the texture, after which the temperature is gradually cooled down to 500 to 600° C. (see FIG. 22).

Conditions "C": The carburization is performed at 830 to 880° C. for 2 to 3 hours, with the atmosphere in the furnace being controlled by mixing an RX gas and nitrogen gas, and subsequently, the temperature is cooled down to 780 to 820° C. which is maintained for 2 to 3 hours thereby to adjust the texture, after which the temperature is gradually cooled down to 500 to 600° C. (see FIG. 22).

Figure 23:
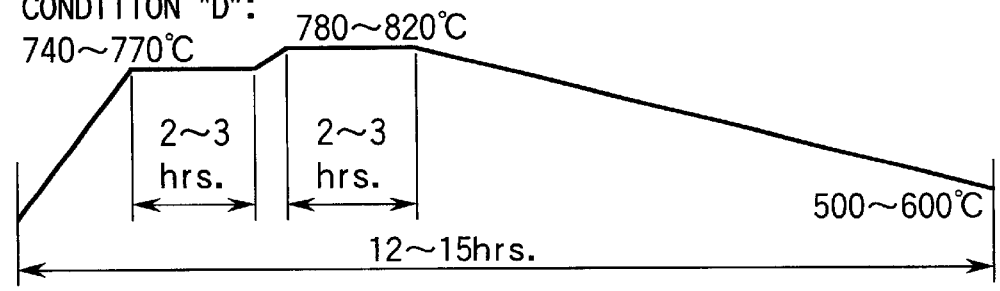
FIG. 23 is a graph explaining a relationship between the time and the temperature when a recarburizing annealing was performed under the conditions of "D"

Conditions "D": The carburization is performed at 740 to 770° C. for 2 to 3 hours, with the atmosphere in the furnace being controlled by mixing an RX gas and nitrogen gas, and subsequently, the temperature is raised up to 780 to 820° C. which is maintained for 2 to 3 hours thereby to adjust the texture, after which the temperature is gradually cooled down to 500 to 600° C. (see FIG. 23).

Furthermore, an annealing was performed by changing the atmosphere of the carburization (recarburization), and the workability as well as the life were compared with each other. However, the samples where the workability was deteriorated were not subjected to the evaluation of life. The results are shown in the following Table 3.

TABLE 3

|  | No. | Recarburizing annealing condition | | Life of CRF tool (piece × $10^3$) | Foreign matters mixed $L_{10}$ life (Hr.) |
| --- | --- | --- | --- | --- | --- |
|  |  | Condition | Cp value |  |  |
| Example | 9 | A | 0.7–0.9 | 17.1 | 24.8 |
|  | 10 | A | 0.9–1.1 | 16.4 | 25.1 |
|  | 11 | B | 0.7–0.9 | 14.8 | 25.3 |
|  | 12 | C | 0.7–0.9 | 16.5 | 24.3 |
|  | 13 | C | 0.9–1.0 | 15.1 | 25.2 |
|  | 14 | D | 0.8–0.9 | 16.6 | 24.3 |
|  | 15 | D | 0.9–1.0 | 15.3 | 24.7 |
| Comparative Example | 10 | A | Over 1.1% | 7.5 | — |
|  | 11 | B | Over 0.9% | 8.5 | — |
|  | 12 | C | Over 1.0% | 7.8 | — |
|  | 13 | D | Less than 0.8% | 16.9 | 16.8 |
|  | 14 | D | Over 1.0% | 7.2 | — |

Although all of Examples 9 to 15 exhibited sufficient workability and life, Examples 11 to 13 among them indicated an insufficient texture after the annealing and a slightly deteriorated workability even though the recarburization was performed at a high temperature so as to perform a sufficient recarburization. In Examples 14 and 15, the recarburization was performed at a low temperature so as to prevent the carburization to become excessive, but the spheroidization of carbide became insufficient, thus slightly deteriorating the workability. Further, in view of the equipment of the furnace and productivity, Examples 11 to 15 may not be optimal.

On the other hand, in the cases of Comparative Examples 10 to 12 and 14, the carburization became more than required, thus extremely deteriorating the workability thereof. In Comparative Example 13, the recarburization was performed at a low temperature and under a low carburizing atmosphere, thus failing to prolong the life due to an insufficient carburization.

Therefore, it has been confirmed that the spheroidizing annealing (which is generally performed by a step of heating a work piece up to a point immediately over the A1 transformation temperature thereof, and then, followed by a step of gradually cooling the work piece) can be optimized by controlling the aforementioned condition "A" where only the atmosphere is turned into a relatively low carburizing atmosphere in such a manner that the CP value thereof is set to 0.7 to 0.9%.

As explained above, it has been found by this invention with respect to the manufacturing method of an inner ring and an outer ring of a deep groove steel ball bearing wherein a grinding work is performed after a heat treatment that, since the magnitude of cutting-off in the turning step or grinding step is minimized to a limit in contrast to the prior method where an over-all turning is performed after the CRF working, the recarburization is required to be performed in a carburizing atmosphere at the occasion of annealing, but if this recarburized layer is left remained to such a degree as to prevent the productivity including the workability from being deteriorated, it is possible to prolong the life of the inner and outer rings. Namely, by optimizing the recarburizing annealing treatment, the effect of reducing the manufacturing cost due to a reduction of cutting-off and the prolonging of life can be simultaneously achieved.

EXAMPLE 16

Figure 24B:
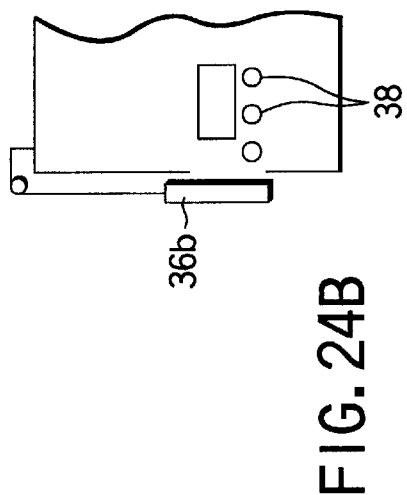

FIGS. 24A and 24B respectively shows a continuous annealing furnace according to Example 16 of the present invention. Herein, FIG. 24A shows an over-all structure of the continuous annealing furnace, while FIG. 24B shows an enlarged view of a main portion of the continuous annealing furnace shown in FIG. 24A.

The continuous annealing furnace shown in FIG. 24 is an apparatus for recarburizing a decarburized surface portion while performing a spheroidizing of the hot-forged portion of a bearing steel of high carbon. Specifically, it is possible to introduce a gas atmosphere such as an RX gas into the furnace, to add a hydrocarbon gas such as propane so as to increase the concentration of carburization, or to add a nitrogen gas so as to decrease the concentration of carburization. The control of the atmosphere in the furnace can be performed by a method of measuring the concentration of carburization in the furnace based on the measurement of residual oxygen content by means of an oxygen sensor, or by a method of calculating the ratio of $(CO)^2/CO_2$ which will be derived from a CO, $CO_2$ meter which takes advantage of the wavelength characteristics of infrared ray.

This annealing furnace comprises a first treatment chamber 31, a second treatment chamber 33 arranged sequentially to the first treatment chamber 31 with an intermediate chamber 32 being interposed therebetween, a spare chamber 34 disposed next to the first treatment chamber 31, and a cooling chamber 35 disposed next to the second treatment chamber 33. The junction between the first treatment chamber 31 and the intermediate chamber 32 is partitioned by an openable door 36a, while the junction between the intermediate chamber 32 and second treatment chamber 33 is partitioned by an openable door 36b. It is made possible through these openable doors to precisely control the atmosphere so as to prevent the atmospheres of these treatment chambers 31 and 33 from being mixed together.

The inlet of spare chamber 34, the junction between the spare chamber 34 and the first treatment chamber 31, and the junction between the second treatment chamber 33 and the cooling chamber 35 are also provided with an openable door 36c, an openable door 36d and an openable door 36e, respectively. At the bottoms of the first treatment chamber 31, the intermediate chamber 32 and second treatment chamber 33 are disposed rollers 38 for moving baskets 37 for carrying therein a treated product. Further, fans 39 for making the carburizing atmosphere homogeneous throughout the interior of each chamber are attached to the ceiling of each chamber.

FIG. 25 shows an ordinary heat cycle of the spheroidizing annealing step of a bearing steel (SUJ2). The temperature is raised up about 750 to 820° C. taking a time period of about 5 to 10 hours. After the temperature is kept at this level, the temperature is gradually lowered down to 500 to 600° C. taking a time period of about 6 to 12 hours.

The non-uniformity of recarburization when the spheroidizing annealing was performed under the aforementioned conditions was investigated. In this investigation, the content of carbon on the surface of the product after the recarburization was measured and the non-uniformity thereof was compared with each other based on the standard deviation.

(1) Product: Forged outer ring of the 6206 bearing;
(2) Raw material: SUJ2;
(3) Portions investigated: Section of outer ring, i.e. four outer circumferential portions of each section.

FIG. 30 illustrates the portions measured of the forged outer ring, wherein FIG. 30A is a perspective view of the forged outer ring; FIG. 30B is a cross-sectional view which is obtained by cutting the ring in the lateral direction along the dotted line shown in FIG. 30A; and FIG. 30C is a partial enlarged view of a portion of the ring shown in FIG. 30B. The measurement was performed from the outermost surface of the outer circumferential surface by means of a line analysis using an EPMA.

(4) Analysis of the surface carbon (%): The content of surface carbon was determined by measuring an average quantity of carbon in a surface layer of 20 μm in thickness by making use of an X-ray measuring apparatus (EPMA-1600, tradename, Shimazu Seisakusho).

(5) The number of measurement: Ten portions (four measuring points×10=the value of standard deviation of the total number of measurement: 40 points).

As a result, the standard deviation ($\sigma_{n-1}$) of the content of surface carbon was found 0.07 in the case of a single door (the prior art), and 0.028 in the case of a double door (this invention). Namely, in the case of a single door (the prior art), the atmospheres are likely to be mixed with each other, thus making it difficult to stabilize the control of the atmosphere, resulting in an increase in non-uniformity of the carbon content of the surface of the product. Whereas in the case of an annealing furnace employing a double door according to this invention, the mixture of atmospheres can be prevented, thus making it possible to obtain a product of stable quality.

Next, the non-uniformity of recarburization when the recarburizing atmosphere was ultimately switched to the decarburizing atmosphere in the annealing method of this invention was investigated. In this investigation, the condition of annealing, the product and method of investigation were the same as those of the aforementioned investigation, and only the difference in decarburization concentration was changed to investigate the non-uniformity. In the case, the decarburization concentration is shown by a difference in the ratio of partial pressure $(CO)^2/CO_2$. The results are shown in FIG. 27. It will be seen from FIG. 27 that when the difference in the ratio of partial pressure $(CO)^2/CO_2$ became less than 2, the non-uniformity of the product was also enlarged.

Then, with regard to the capabilities of the bearing obtained by the annealing method of this invention, the life thereof was evaluated. As described above, when the present inventors have investigated as to the state of damage in the bearings which are generally employed in the industries, most of them are found as being suffered from a surface damage type fatigue. Therefore, a test using a lubricating oil contaminated with a foreign matter that may become a cause for the surface-originating type damage was performed thereby to evaluate the bearing.

In this test, a deep shaft ball 6206 was employed, and the inner and outer rings of the bearing to be evaluated were subjected to the annealing according to this invention. As for the rolling element, an ordinary SUJ2 ball was employed. The life time when a flaking was generated was measured thereby to prepare a Weibull plot. From this Weibull distribution, $L_{10}$ life of each ball was determined. Since the bearing that has been manufacture according to the conventional method is accompanied with neither the carburization nor decarburization, the $L_{10}$ life thereof was defined as being 1, and the bearings exhibiting a varied surface condition were evaluated by comparing the ratio of the $L_{10}$ life.

The measurements of the carburization ratio and of carburization depth were performed under the following conditions.

(1) Portions of product investigated: Groove of inner ring of the finished bearing 6206;

(2) Raw material: SUJ2;

(3) Analysis of the surface carbon (%): The content of surface carbon was determined by measuring an average quantity of carbon in a surface layer of 10 $\mu$m in thickness by making use of an X-ray measuring apparatus (EPMA-1600, tradename, Shimazu Seisakusho), and the depth which exhibited the same carbon content as that of the raw material was defined as being the carburization depth.

(4) The number of measurement: Ten portions (each one point measurement×10=the total number of measurement: 10 points, an average of which was defined as being the carbon content).

The conditions for the life test were as follows.

Pressure on the testing surface: Maximum 260 MPs;

Revolution speed: 3,000 rpm;

Lubricating oil: 468 turbine oil;

Mixed foreign matter:

Composition: stainless-based powder;

Hardness: HRC52;

Particle diameter: 74–147 $\mu$m;

Quantity: 500 ppm in the lubricating oil.

The results evaluated based on the carburization ratio are shown in FIG. 28 and the results evaluated based on the carburization depth are shown in FIG. 29. When the carburization ratio is minus, i.e. when the decarburization is left remained on the surface of the finished product, the life thereof would be greatly deteriorated. However, when the carburization ratio is 0.1% or more as defined by this invention, the life thereof would be more than comparable to the life of the conventional product, thereby making it possible to obtain a stable life with a reduced cost. Further, if the carburization ratio is 0.5% or more, the effect of prolonging the life would become prominent.

When the carburization depth is minus, it means that the decarburization is left remained on the surface of the finished product, thus indicating a decarburization depth where the carbon content agrees with that of the raw material. When the carburization depth is minus, the life thereof would be greatly deteriorated. However, when the carburization depth is 0.01 mm or more as defined by this invention, the life thereof would be more than comparable to the life of the conventional product, thereby making it possible to obtain a stable life with a reduced cost. Further, if the carburization depth is 0.1 mm or more, the effect of prolonging the life would become prominent.

As explained above, the present inventors have succeeded to find out an annealing method and a continuous annealing furnace which are capable of controlling a carburizing atmosphere at low temperatures for performing spheroidizing annealing, capable of performing a follow-up control of carbonization atmosphere in relative to changes in temperature in a step of descending temperature, or capable of satisfactorily performing a recarbonization treatment even if a large number of works are piled up in bulk and contacted with each other. Therefore, it has become possible according to this invention to minimize the finishing work of mechanical parts such as a bearing which is manufactured by means of a hot forging and a subsequent finishing work, so that the decarburization in the spheroidizing annealing can be inhibited, and at the same time, it is now possible to perform, in a stable manner and at low cost, the recarbonization of the decarburized portion that has been generated in a raw material or at the occasion of hot forging. Further, depending on the conditions of recarbonization, the effects of saving the manufacturing cost and of prolonging the life can be simultaneously obtained.

EXAMPLES 17 TO 25

The continuous annealing furnace shown in FIG. 24 can be also employed in Examples 17 to 25. These Examples 17 to 25 are featured in that the decarburization in a decarburizing gas atmosphere is performed in the first treatment chamber 31, and the spheroidizing annealing in a non-oxidizing atmosphere or in a decarburizing atmosphere is performed in the second treatment chamber 33. Further, a gas atmosphere such as an RX gas is introduced into the first treatment chamber 31, and additionally, a hydrocarbon gas such as propane for enhancing the carbonization concentration is added to the gas atmosphere thereby to control the carbonization in the chamber. On the other hand, as a gas atmosphere, a mixture consisting of an RX gas and a decarburizing exothermic modified gas such as an NX gas is introduced into the second treatment chamber 33.

The control of the atmosphere in the furnace can be achieved by determining the contents of CO and $CO_2$ in the gas atmosphere by means of an infra-red analyzer and then, calculating the ratio of $(CO)^2/CO_2$ on the basis of the above analysis, thus controlling the concentration of carbon in the furnace.

As for the test piece, a 6206 outer ring that has been molded by hot-forging a steel bar obtained from the rolling was employed and offered to the test in the aforementioned continuous annealing furnace. Further, the measurement of carburization and carburization depth after the recarburizing annealing experiment was performed as follows.

FIG. 25 shows an ordinary heat cycle in the spheroidizing annealing step of a bearing steel (SUJ2). In this case, the temperature is raised up about 750 to 820° C. taking a time period of about 5 to 10 hours. After the temperature is kept at this level, the temperature is gradually lowered down to 680 to 700° C. taking a time period of about 6 to 12 hours and then, further cooled down to 500 to 600° C. taking a time period of about one hour.

(1) Raw material: SUJ2;

(2) Analysis of the surface carbon (%): The content of surface carbon was determined by measuring an average quantity of carbon in a surface layer of 10 μm in thickness by performing a line analysis of a sample of a sectioned piece obtained after annealing and by making use of an X-ray measuring apparatus (EPMA-1600, tradename, Shimazu Seisakusho). In this case, the depth which exhibited the same carbon content as that of the raw material was defined as being the carburization depth. The general features with respect to this measurement are the same as explained with reference to FIG. 30.

(4) The number of measurement: Ten portions (in the direction of 90°, two points/each piece×10=the total number of measurement: 20 points, an average of which was defined as being the carbon content).

For each condition, about 50 pieces of rings for forging including the aforementioned ring for measuring were subjected to a treatment under a heat cycle shown in FIG. 25 in the continuous annealing furnace shown in FIG. 24.

FIG. 25 shows an ordinary heat cycle in the spheroidizing annealing step of a bearing steel (SUJ2). In this case, the temperature is raised up about 750 to 820° C. taking a time period of about 5 to 10 hours. After the temperature is kept at this level, the temperature is gradually lowered down to 680 to 700° C. taking a time period of about 6 to 12 hours and then, further cooled down to 500 to 600° C. taking a time period of about one hour.

In this experiment, the conditions of atmosphere in the first treatment chamber 31 representing a period of recarburization and in the second treatment chamber 33 representing a period of annealing were variously changed, and the first treatment chamber 31 was filled with a gas atmosphere comprising an RX gas and propane, if required, and the contents of CO and $CO_2$ in the gas atmosphere were analyzed so as to calculate, based on this analyzed values, the ratio of $P(CO)^2/PCO_2$.

The control of the atmosphere was performed under the condition of value "B" shown in the following Table 4.

TABLE 4

| | No. | Value "A" | Value "B" | Recarburization (%) | External appearance |
|---|---|---|---|---|---|
| Comparative | 15 | 7.5 | 0.8 | 1.35 | Sooting: High |
| Example | 16 | 4 | 0.8 | 0.68 | Oxide scale: High |
| | 17 | 7 | 2.4 | 1.33 | Sooting: High |

TABLE 4-continued

| | No. | Value "A" | Value "B" | Recarburization (%) | External appearance |
|---|---|---|---|---|---|
| | 18 | 4 | 2.3 | 0.76 | Oxide scale: Yes |
| | 19 | 6 | 0.6 | 0.70 | Oxide scale: High |
| Example | 17 | 4.5 | 0.8 | 0.85 | Good |
| | 18 | 7 | 1.8 | 1.08 | Good |
| | 19 | 6 | 2 | 0.85 | Good |
| | 20 | 7 | 2.3 | 1.15 | Good |
| | 21 | 7 | 0.8 | 1.00 | Good |
| | 22 | 6.2 | 0.7 | 0.97 | Good |
| | 23 | 4.5 | 1.3 | 1.00 | Good |
| | 24 | 7 | 1.6 | 1.05 | Good |
| | 25 | 4.5 | 2.26 | 1.05 | Good |

In this Table 4, the value "A" means carburization concentration in the fore-stage treatment chamber, while the value "B" means carburization concentration in the post-stage treatment chamber. There is a relationship between these values "A" and "B" as shown below.

Value "B"=(8/value "A")±0.5

Table 4 illustrates the carburization and external appearance of the examples where these values of "A" and "B" are altered. Comparative Examples 16, 18 and 19 where the value of "A" falls out of the range of 4.5 to 7.0 and the value of "B" also falls out of the range of 0.8 to 2.3 indicated a carburization of 0.7 or less, thus suggesting that the decarburization generated after finishing the forging was not sufficiently recarburized. Moreover, the generation of oxide scaling was recognized on the surface of the ring after the annealing. On the contrary, in the cases of Comparative Examples 15 and 17, they indicated a carburization of 1.33 or more, thus suggesting an excessive carburization and a large quantity of sooting was recognized on the surface of the ring.

Examples 16, 18, 19 and 20 where the value of "A" falls within the range of 4.5 to 7.0 and the value of "B" also falls within the range of 0.8 to 2.3 indicated a sufficient recarburization of the decarburization portion that had been generated after finishing the forging, the carburization thereof being not less than 0.85 or not more than 1.15. In the case of bearing steel, if the capabilities such as rolling fatigue or abrasion resistance are to be sufficiently ensured, the carburization of not less than 0.85 would be sufficient, and if the carburization is controlled to not more than 1.15, the generation of sooting would not be recognized on the surface of the ring, thus exhibiting an excellent external appearance.

Examples 21, 22, 23, 24 and 25 where the relationship among the value of "A", the value of "B" and the atmosphere-controlling value of {a value of $P(CO)^2/PCO_2$} are controlled to meet the equation of; Value "B" (8/value "A")±0.5 indicated an excellent carburization ranging from 0.97 to 1.05, which is nearly close to the C % of the raw material formed of SUJ2. In this case, the external appearance thereof is of course quite excellent.

FIG. 31 shows the relationship {a value of $P(CO)^2/PCO_2$} between the annealing period and the carburizing period of Examples 15 to 19 and 17 to 25.

It is preferable in this FIG. 31 that the value of "A" falls within the range of 0.8 to 2.3 and the value of "B" falls within the range of 4.5 to 7.0, and more preferably, these values of "A" and "B" should be falling inside the shaded region.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A continuous annealing method for enabling a continuous spheroidizing annealing of roller members made of a high carbon bearing steel comprising:

passing the roller members to be treated through an annealing furnace comprising two or more treatment chambers sequentially connected with each other and respectively filled with a gas atmosphere differing in carburizing property from that of the other chambers, and said treatment chambers comprising a carburizing chamber wherein the roller members to be treated are carburized at 750° C. to 820° C., a slow cooling chamber wherein the roller members are cooled at said carburizing chamber temperature or less than said carburizing chamber temperature, an intermediate chamber provided between said carburizing chamber and said slow cooling chamber, including atmosphere gas blocking doors that can open and close an exit of said carburizing chamber and an entrance of said slow cooling chamber independently; and transferring the roller members to be treated through said carburizing, intermediate and slow cooling chambers, wherein each of the said carburizing, intermediate and slow cooling chambers is filled to satisfy a relationship of $K_1-K_2 \geq 2$, where $K_1$ represents a partial pressure ratio between CO and $CO_2$ in an atmosphere within said carburizing chamber and $K_2$ represents a partial pressure ratio between CO and $CO_2$ in an atmosphere within said slow cooling chamber; and a surface of a finished roller member having been subjected to a pre-process, exhibits a maximum carburization ratio of 5 to 30% and a carburization depth of 0.1 to 0.5 mm.

2. The continuous annealing method according to claim 1, wherein the partial pressure ratio between CO and $CO_2$ in the atmosphere within said carburizing chamber is 4.5 to 7.0 and the partial pressure ratio between CO and $CO_2$ in the atmosphere within said slow cooling chamber is 0.8 to 2.3.

3. The continuous annealing method according to claim 1, wherein a value A and a value B satisfy a relationship of: value B=(8/value A)±0.5, where the value A represents a partial pressure ratio between CO and $CO_2$ in an atmosphere within said carburizing chamber and the value B represents a partial pressure ratio between CO and $CO_2$ in an atmosphere within said slow cooling chamber.

4. The continuous annealing method according to claim 1, wherein the atmosphere within said carburizing chamber is filled with a partial pressure of CO which is 10% to 30% of the atmosphere.

5. The continuous annealing method according to claim 1, wherein a substitution ratio of the carburizing gas in said carburizing chamber is twice/hour or more and a pressure inside said annealing furnace is 1 mm/$H_2O$ or more, wherein the relationship among the substitution ratio "T", a volumetric capacity "V" ($m^3$) of said annealing furnace and the flow rate of the atmospheric gas "R" ($m^3/hr$) meets the following equation:

$$T=R/V.$$

6. The continuous annealing method according to claim 1, wherein the oxygen partial pressure of the atmosphere at least in the slow cooling chamber is $3\times10^{-18}$ atm or less.

* * * * *

UNITED STATES PATENT AND TRADEMARK OFFICE
CERTIFICATE OF CORRECTION

PATENT NO.    : 6,620,262 B1
DATED         : September 16, 2003
INVENTOR(S)   : S. Okita et al.

It is certified that error appears in the above-identified patent and that said Letters Patent is hereby corrected as shown below:

Title page, Item [54] and Column 1, lines 1-4,
Title, "METHOD OF MANUFACTURING INNER AND OUTER RACES OF DEEP GROOVE BALL BEARING IN CONTINUOUS ANNEALING FURNACE" should read -- CONTINUOUS ANNEALING FURNACE, ROLLER BEARING, ANNEALING METHOD AND METHOD FOR MANUFACTURING AN INNER RING AND AN OUTER RING FOR DEEP GROOVE BALL BEARING --

Title page,
Item [75], Inventors, "Yokohama" should read -- Fujisawa-shi --; and "Naka-gun" should read -- Fujisawa-shi --
Item 22, PCT Filed, "Dec. 26, 1997" should read -- Dec. 25, 1998 --

Signed and Sealed this

Fifteenth Day of June, 2004

JON W. DUDAS
*Acting Director of the United States Patent and Trademark Office*